(12) United States Patent
He et al.

(10) Patent No.: US 12,480,582 B2
(45) Date of Patent: Nov. 25, 2025

(54) ELECTRONIC EXPANSION VALVE

(71) Applicant: ZHEJIANG DUNAN ARTIFICIAL ENVIRONMENT CO., LTD., Zhejiang (CN)

(72) Inventors: Yuchen He, Zhejiang (CN); Yonghao Chen, Zhejiang (CN); Shaojun Zhan, Zhejiang (CN); Kepeng Zhang, Zhejiang (CN); Jinqiang Lou, Zhejiang (CN); Jun Zhao, Zhejiang (CN); Leqiang Liu, Zhejiang (CN)

(73) Assignee: ZHEJIANG DUNAN ARTIFICIAL ENVIRONMENT CO., LTD., Zhejiang (CN)

( * ) Notice: Subject to any disclaimer, the term of this patent is extended or adjusted under 35 U.S.C. 154(b) by 0 days.

(21) Appl. No.: 18/688,768

(22) PCT Filed: Aug. 30, 2022

(86) PCT No.: PCT/CN2022/115942
§ 371 (c)(1),
(2) Date: Mar. 2, 2024

(87) PCT Pub. No.: WO2023/030337
PCT Pub. Date: Mar. 9, 2023

(65) Prior Publication Data
US 2024/0384799 A1 Nov. 21, 2024

(30) Foreign Application Priority Data

Sep. 2, 2021 (CN) .......................... 202122112662.6
Sep. 2, 2021 (CN) .......................... 202122113665.1
(Continued)

(51) Int. Cl.
F16K 1/42 (2006.01)
F16K 1/32 (2006.01)
(Continued)

(52) U.S. Cl.
CPC .................. *F16K 1/42* (2013.01); *F16K 1/32* (2013.01); *F16K 1/38* (2013.01); *F16K 1/54* (2013.01); *F16K 27/029* (2013.01); *F16K 31/02* (2013.01)

(58) Field of Classification Search
CPC ..... F16K 1/42; F16K 1/32; F16K 1/38; F16K 1/54; F16K 27/029; F16K 31/02
(Continued)

(56) References Cited

U.S. PATENT DOCUMENTS 1,968,779 A * 7/1934 Johnsen .................. F16K 41/14
251/87
2,709,451 A * 5/1955 La Bour ................ F16K 39/022
251/86
(Continued)

FOREIGN PATENT DOCUMENTS

CN 107631524 A 1/2018
CN 109519592 A 3/2019
(Continued)

OTHER PUBLICATIONS

The first office action of counterpart JP application No. 2024507081 issued on May 1, 2025.
(Continued)

*Primary Examiner* — John Bastianelli
(74) *Attorney, Agent, or Firm* — The Sun IP Law

(57) ABSTRACT

Disclosed is an electronic expansion valve. The electronic expansion valve includes a valve seat provided with a valve cavity and a valve port, wherein the valve port is arranged at an end portion of the valve cavity; a guide sleeve fixedly arranged on the valve seat, the guide sleeve is provided with a first guide hole, and the first guide hole is in communication with the valve cavity; and a valve needle movably arranged in the guide sleeve, wherein a first end of the valve
(Continued)

needle penetrates out of the first guide hole to be arranged corresponding to the valve port, the valve needle is in clearance fit with the first guide hole, the valve needle is configured to control the valve port to be opened or closed, and a swingable amplitude of the valve needle in the first guide hole ranges from 0.4° to 2.4°.

28 Claims, 11 Drawing Sheets

(30) Foreign Application Priority Data

| | | | |
|---|---|---|---|
| Sep. 2, 2021 | (CN) | ......................... | 202122116122.5 |
| Sep. 2, 2021 | (CN) | ......................... | 202122116505.2 |

(51) Int. Cl.
  *F16K 1/38* (2006.01)
  *F16K 1/54* (2006.01)
  *F16K 27/02* (2006.01)
  *F16K 31/02* (2006.01)

(58) Field of Classification Search
  USPC ... 251/86–87, 118, 120–122, 129.01–129.22
  See application file for complete search history.

(56) References Cited

U.S. PATENT DOCUMENTS

| | | | | |
|---|---|---|---|---|
| 3,219,311 A | * | 11/1965 | Siver | .................. F16K 1/38 |
| | | | | 251/210 |
| 4,073,469 A | * | 2/1978 | Kodric | .................. B29C 45/231 |
| | | | | 251/86 |
| 4,437,488 A | * | 3/1984 | Taggart | .................. B05C 5/0225 |
| | | | | 251/86 |
| 4,852,853 A | * | 8/1989 | Toshio | .................. F16K 31/0693 |
| | | | | 251/86 |
| 6,244,295 B1 | * | 6/2001 | Bartussek | ........... F16K 27/0245 |
| | | | | 137/540 |
| 7,036,788 B1 | * | 5/2006 | Schneider | ........... F16K 31/0693 |
| | | | | 251/129.08 |

FOREIGN PATENT DOCUMENTS

| | | |
|---|---|---|
| CN | 209042826 U | 6/2019 |
| CN | 107289138 B | 4/2020 |
| CN | 210372219 U | 4/2020 |
| CN | 213419899 U | 6/2021 |
| CN | 215763306 U | 2/2022 |
| CN | 215806405 U | 2/2022 |
| CN | 216158292 U | 4/2022 |
| CN | 216158306 U | 4/2022 |
| CN | 216158324 U | 4/2022 |
| EP | 3792529 A1 | 3/2021 |
| JP | 2006071186 A | 3/2006 |
| JP | 2019046235 A | 3/2019 |
| WO | 2020135162 A1 | 7/2020 |

OTHER PUBLICATIONS

The first office action of counterpart EP application No. 22863472 issued on Jul. 18, 2025.

* cited by examiner

ELECTRONIC EXPANSION VALVE

CROSS-REFERENCE TO RELATED APPLICATION

The disclosure claims the priority to Patent Application No. 202122116505.2, filed with the China National Intellectual Property Administration on Sep. 2, 2021 and entitled "Electronic expansion valve"; the disclosure claims the priority to Patent Application No. 202122112662.6, filed with the China National Intellectual Property Administration on Sep. 2, 2021 and entitled "Electronic expansion valve"; the disclosure claims the priority to Patent Application No. 202122116122.5, filed with the China National Intellectual Property Administration on Sep. 2, 2021 and entitled "Electronic expansion valve"; and the disclosure claims the priority to Patent Application No. 202122113665.1, filed with the China National Intellectual Property Administration on Sep. 2, 2021 and entitled "Valve seat and electronic expansion valve with Valve seat".

TECHNICAL FIELD

The disclosure relates to the technical field of valves, and in particular to an electronic expansion valve.

BACKGROUND

An electronic expansion valve, a novel control element, has become a significant constituent part of a smart refrigeration system. The electronic expansion valve includes a base, a guide sleeve, and a valve needle. The base is provided with a valve cavity, a valve port is provided in the valve cavity, and the guide sleeve fixedly matches the valve seat. Moreover, the guide sleeve and the valve port are oppositely arranged, and the valve needle is movably arranged in the guide sleeve and partially penetrates the guide sleeve to be positioned in the valve cavity. The valve needle is used for controlling the valve port to be opened or closed. However, in a working process of an existing electronic expansion valve, a fluid applies a certain impact force to the valve needle. The valve needle will shake to disturb the fluid under the action of the impact force. In consequence, a shaking noise of the valve needle and a fluid noise are generated in the working process of the electronic expansion valve, which affects the user experience.

SUMMARY

Some embodiments of the disclosure provide an electronic expansion valve, so as to solve the problem of an excessive noise caused by shaking of a valve needle of an electronic expansion valve in a related art.

Some embodiments of the disclosure provide an electronic expansion valve. The electronic expansion valve includes a valve seat provided with a valve cavity and a valve port, where the valve port is provided at an end portion of the valve cavity; a guide sleeve fixedly arranged on the valve seat, where the guide sleeve and the valve port are oppositely arranged, the guide sleeve is provided with a first guide hole, and the first guide hole is in communication with the valve cavity; and a valve needle movably arranged in the guide sleeve, wherein a first one end of the valve needle penetrates out of the first guide hole to be arranged correspondingly to the valve port, the valve needle is in clearance fit with the first guide hole, the valve needle is configured to control the valve port to be opened or closed, and a swingable amplitude of the valve needle in the first guide hole ranges from 0.4° to 2.4°.

With the technical solution of the disclosure applied, when the electronic expansion valve works, a fluid applies a certain impact force to the valve needle. The valve needle shakes under the action of the impact force from the fluid. In this case, an included angle exists between an axis of the valve needle and an axis of the guide sleeve and ranges from 0.2° to 1.2°. If the included angle between the axis of the valve needle and the axis of the guide sleeve is greater than 1.2°, a swingable range of the valve needle is too wide. In consequence, the fluid is disturbed excessively owing to shaking of the valve needle, and a high fluid noise and a high shaking noise are generated finally. Moreover, the coaxiality between the valve needle and the guide sleeve is undesirable, which is not conducive to the cooperation between the valve needle and the valve port. If the included angle between the axis of the valve needle and the axis of the guide sleeve is smaller than 0.2°, no gap between a side wall of the valve needle and a hole wall of the first guide hole can be ensured. In a repeated movement process of the valve needle, the side wall of the valve needle may make contact with the hole wall of the first guide hole. In consequence, the valve needle and the guide sleeve are worn, and the service lives of the valve needle and the guide sleeve are affected. Therefore, the swingable amplitude of the valve needle is set to range from 0.4° to 2.4°. The shaking noise of the valve needle and the fluid noise are reduced while the service lives of the valve needle and the guide sleeve are ensured.

Further, a gap between an outer side wall of the valve needle and an inner wall of the first guide hole ranges from 0.0075 mm to 0.05 mm. With such an arrangement, the coaxiality between the valve needle the guide sleeve can be ensured. Accordingly, the service lives of the valve needle and the guide sleeve can be ensured while the shaking noise and the fluid noise of the electronic expansion valve can be reduced.

Further, a length of the first guide hole ranges from 1.5 mm to 7 mm. With such an arrangement, the shaking noise and the fluid noise of the electronic expansion valve can be reduced.

Further, the valve needle includes a cylindrical section and a conical section that are sequentially arranged in an axial direction, and the conical section is arranged close to the valve port; and the valve needle is provided with a blocking position and a maximum opening position that are oppositely arranged, and when the valve needle moves to the maximum opening position, the conical section is positioned on an outer side of the guide sleeve entirely. With such an arrangement, the valve needle can control the valve port to be opened or closed smoothly while a guide effect of the guide sleeve on the valve needle can be ensured, so as to reduce the shaking noise of the valve needle.

Further, when the valve needle moves to the maximum opening position, a distance between an end surface, close to the conical section, of the cylindrical section and an end surface of an end, close to the valve port, of the guide sleeve is smaller than 1 mm. With such an arrangement, the shaking noise of the valve needle and the fluid noise can be reduced.

Further, when the valve needle moves to the maximum opening position, the end face, close to the conical section, of the cylindrical section is flush with the end surface, close to the valve port, of the guide sleeve. With such an arrangement, a turbulence phenomenon caused when the valve needle occupies an excessive space in the valve cavity can be reduced, so as to reduce the fluid noise while the guide effect of the guide sleeve on the valve needle can be ensured, so as to reduce the shaking noise of the valve needle.

Further, chamfers are arranged on inner peripheral surfaces of two ends of the first guide hole. With the chamfers arranged, the smoothness in the movement process of the valve needle can be improved while the valve needle can be assembled to the guide sleeve conveniently.

Further, the guide sleeve is further provided with a second guide hole, where the second guide hole is coaxially arranged with the first guide hole, the second guide hole is positioned at an end, away from the valve cavity, of the first guide hole and is in communication with the first guide hole, and an aperture of the second guide hole is greater than an aperture of the first guide hole; and the electronic expansion valve further includes a spring sleeve and a spring, where the spring sleeve is movably arranged in the second guide hole, a second end, away from the valve port, of the valve needle is positioned in the spring sleeve, the spring is positioned in the spring sleeve, and a first end of the spring abuts against the valve needle. With the spring and the spring sleeve arranged, movement and shaking of the valve needle can be buffered, the smoothness in the movement process of the valve needle can be ensured, and the shaking noise generated when the valve needle shakes can be reduced while.

Further, the electronic expansion valve is further provided with a mounting cavity, where the mounting cavity and the valve cavity are in communication with each other and forms an accommodation cavity, and the mounting cavity and the valve port are oppositely arranged; and the electronic expansion valve further includes: a screw rod movably arranged in the accommodation cavity, wherein a first end of the screw rod is positioned in the mounting cavity, and a second end of the screw rod is positioned in the valve cavity; and a bearing arranged in the spring sleeve, where the bearing includes an inner ring and an outer ring, and an end portion of the screw rod penetrates the spring sleeve to be fixedly connected with the inner ring.

Further, the electronic expansion valve further includes: a gasket arranged in the spring sleeve, where the gasket is positioned between the spring and the bearing, a first end of the gasket abuts against one end, away from the valve needle, of the spring, and a second end of the gasket abuts against the outer ring of the bearing. With such an arrangement, the smoothness in the movement process of the valve needle can be ensured, and the fluid noise and a mechanical noise generated when the electronic expansion valve works can be reduced.

Further, a2 denotes a gap between the gasket and the spring sleeve, and a1 is smaller than or equal to a2. If a1 is greater than a2, a gap between the valve needle and the guide sleeve is large, so that the coaxiality between the valve needle and the valve port is undesirable, and the valve needle shakes when moving. Therefore, a1 is smaller than or equal to a2, so that the coaxiality between the valve needle and the guide sleeve is desirable, and the valve needle shakes slightly and generates a low mechanical noise.

Further, a3 denotes a gap between the bearing and the spring sleeve, and a1 is smaller than or equal to a3. If a1 is greater than a3, the gap between the valve needle and the guide sleeve is large, so that the coaxiality between the valve needle and the valve port is undesirable. Therefore, a1 is smaller than or equal to a3, so that the coaxiality between the valve needle and the guide sleeve is good, and the valve needle shakes slightly and generates a low mechanical noise.

Further, a4 denotes a gap between the spring sleeve and the guide sleeve, and a1 is smaller than or equal to a4. If a1 is greater than a4, the gap between the valve needle and the guide sleeve is large, so that the coaxiality between the valve needle and the valve port is undesirable (i.e. poor), and the valve needle shakes and generates a large noise when moving. Therefore, a1 is smaller than or equal to a4, so that the coaxiality between the valve needle and the guide sleeve is desirable, and the valve needle shakes slightly and generates a low mechanical noise.

Further, the gap a2 between the gasket and the spring sleeve ranges from 0.04 mm to 0.15 mm. When a2 is smaller than 0.04 mm, a friction force between the gasket and the spring sleeve is large. When a2 is greater than 0.15 mm, the coaxiality between the gasket and the spring sleeve is undesirable, resulting in the undesirable coaxiality between the spring and the valve port and the undesirable coaxiality between the valve needle and the valve port.

Further, the gap a3 between the bearing and the spring sleeve ranges from 0.04 mm to 0.15 mm. When a3 is smaller than 0.04 mm, a friction force between the bearing and the spring sleeve is large. When a3 is greater than 0.15 mm, the coaxiality between the bearing and the spring sleeve is undesirable, resulting in the undesirable coaxiality between the screw rod integrated with the bearing and the valve port.

Further, the gap a4 between the spring sleeve and the guide sleeve ranges from 0.04 mm to 0.15 mm. When a4 is smaller than 0.04 mm, a friction force between the guide sleeve and the spring sleeve is large. When a4 is greater than 0.15 mm, the coaxiality between the guide sleeve and the valve port is undesirable, resulting in the undesirable coaxiality between the spring sleeve and the valve port.

Further, the guide sleeve includes a body section and a thin-walled section that are sequentially connected in an axial direction, the body section is provided with a first end and a second end that are oppositely arranged, the thin-walled section is connected with the first end of the body section, and an end surface of the first end and the thin-walled section are positioned in the valve cavity; an outer diameter of the thin-walled section is smaller than an outer diameter of the first end, and an outer diameter of a first end, close to the body section, of the thin-walled section is greater than an outer diameter of a second end, away from the body section, of the thin-walled section; and the valve needle partially penetrates the guide sleeve to be positioned in the valve cavity, the valve needle is configured to control the valve port to be opened or closed, and the thin-walled section guides the valve needle.

With the technical solution provided by the disclosure, when flowing into the valve cavity, the fluid makes contact with the valve needle and applies a certain impact force to the valve needle and the guide sleeve. With the above arrangement, a height difference of a step structure formed between an end, close to the valve port, of the guide sleeve and the valve needle can be reduced. Accordingly, the turbulence phenomenon generated when the fluid impacts the step structure can be reduced, so as to reduce the fluid noise generated when the electronic expansion valve works.

Further, a difference between the outer diameter of the thin-walled section and an inner diameter of the thin-walled section ranges from 0.15 mm to 1.5 mm. With such an arrangement, the structural strength of the thin-walled section can be ensured.

Further, the thin-walled section includes at least one of a tapered section and a linear section in a direction from the thin-walled section to the body section. With such an arrangement, the guide sleeve can be adapted to electronic expansion valves having different structures, so that the adaptability of the guide sleeve can be improved.

Further, the outer diameter of the thin-walled section is gradually increased in a direction from the thin-walled section to the body section. With such an arrangement, the fluid noise caused by a sudden change in an outer peripheral surface of the thin-walled section can be reduced.

Further, the electronic expansion valve further includes a first connection pipe, wherein the first connection pipe is arranged on the valve seat, the first connection pipe is in communication with the valve cavity, and an axis of the first connection pipe is perpendicular to an axis of the valve needle; and R denotes a radius of the first connection pipe, and a distance between the end surface of the first end of the body section and the axis of the first connection pipe ranges from R−0.5 mm to R+0.5 mm. The distance between the end surface of the first end and the axis of the first connection pipe is set to range from R−0.5 mm to R+0.5 mm. Accordingly, the guide sleeve occupies a narrower space in the valve cavity, and a space through which the fluid can flow in the valve cavity can be ensured. Therefore, the turbulence phenomenon caused by a too narrow space through which the fluid can flow can be reduced, so that the fluid noise generated in the working process of the electronic expansion valve can be reduced.

Further, R denotes the distance between the end surface of the first end of the body section and the axis of the first connection pipe. With such an arrangement, the guide sleeve can occupy a narrower space in the valve cavity while the guide effect of the guide sleeve on the valve needle can be ensured. Therefore, the fluid noise caused by a too narrow space for the fluid to flow therethrough in the valve cavity can be reduced while the mechanical noise caused by shaking of the valve needle can be reduced.

Further, the guide sleeve is provided with a first hole section and a second hole section that are arranged in a stepped manner, where the first hole section is positioned in the body section, the second hole section penetrates the end surface of the first end of the body section and the thin-walled section, and the second hole section is configured to be in guide fit with the valve needle. With such an arrangement, other components cooperating with the valve needle can be mounted into the second hole section conveniently while the smoothness in a movement and mounting process of the valve needle can be ensured.

Further, a length of the second hole section ranges from 1.5 mm to 7 mm, and a length of the thin-walled section is smaller than 6 mm. With such an arrangement, the valve needle can occupy a narrower space in the valve cavity, and the mechanical noise caused by shaking of the valve needle and the fluid noise during working of the electronic expansion valve can be reduced while a length within which the guide sleeve cooperates with the valve needle can be ensured.

Further, chamfers are arranged on the guide sleeve, and the chamfers are positioned on inner peripheral surfaces of two ends of the second hole section individually. With the chamfers arranged, assembling of the valve needle can be guided, and mounting of the valve needle can be facilitated.

Further, the guide sleeve further includes a fixing bulge, wherein the fixing bulge is annularly arranged on an outer side of the body section, the fixing bulge is arranged close to the first end of the body section, and the fixing bulge is fixedly connected to the valve seat. With such an arrangement, a contact area between the guide sleeve and the valve seat can be ensured, so as to ensure the assembly stability between the guide sleeve and the valve seat.

Further, the valve seat is provided with a first connection port and a second connection port, where the first connection port is in communication with the valve cavity; the valve seat is further provided with a first transition hole section and a second transition hole section, where the first transition hole section, the valve port, and the second transition hole section are connected sequentially, the first transition hole section is in communication with the valve cavity, and the second transition hole section is in communication with the second connection port; and the second transition hole section is provided with a third end and a fourth end that are oppositely arranged, where the third end is connected to the valve port, a diameter of the third end equals the diameter of the valve port, and a diameter of the second transition hole section is gradually increased in a direction from the third end to the fourth end. The first connection port and the second connection port are connected to apparatuses in a use environment individually. The fluid flows from the first connection port to the second connection port or from the second connection port to the first connection port.

With the technical solution of the disclosure applied, the third end of the second transition hole section is connected with the valve port, the diameter of the third end equals the diameter of the valve port, and the diameter of the second transition hole section is gradually increased in the direction from the third end to the fourth end. With such an arrangement, when the fluid flows from the first connection port to the second connection port or from the second connection port to the first connection port, under the condition that the fluid flows through the valve port and the second transition hole section, a diameter of a passage through which the fluid flows is changed gradually without being increased or decreased suddenly. Therefore, the fluid can flow smoothly, which can reduce the possibility of generating a fluid vortex, so that the noise generated by the electronic expansion valve can be reduced.

Further, a diameter of a first end, close to the valve port, of the first transition hole section is greater than the diameter of the valve port. With such an arrangement, when the fluid flows from the first connection port to the second connection port, a liquid remains at the first transition hole section, and gas doped in a liquid fluid overflows into the valve cavity. Accordingly, more liquid fluids flow through the valve port, and the noise generated when the fluid flows through the valve port can be reduced.

Further, the valve seat is further provided with a third transition hole section, where the third transition hole section is positioned at a second end, away from the valve port, of the first transition hole section; and a first end of the third transition hole section is in communication with the first transition hole section, a second end of the third transition hole section is in communication with the valve cavity, and a diameter of the third transition hole section is gradually decreased in a direction towards the valve port. The diameter of the third transition hole section is gradually decreased in the direction towards the valve port. In this way, when the fluid flows from the first transition hole section to the third transition hole section or from the third transition hole section to the first transition hole section, a diameter of a passage through which the fluid flows is changed gradually. Accordingly, the fluid is buffered, so that the noise generated when the fluid flows is low, and the noise generated when the electronic expansion valve works is further reduced.

Further, the first transition hole section and the valve port are cylindrical sections, and the second transition hole section and the third transition hole section are conical sections. With such an arrangement, the machining process of the valve seat is simplified. The diameters of the conical sections are gradually and slowly changed, so that the diameter of the passage through which the fluid flows is changed gradually. Accordingly, no large vortex is generated, and the noise generated when the fluid flows is low.

Further, the second transition hole section is a tapered hole, and a taper angle of the second transition hole section ranges from 30° to 65°. With such an arrangement, the diameter of the second transition hole section is slowly changed, so that the noise generated when the fluid flows is further reduced.

Further, the sum of a length of the first transition hole section and a length of the third transition hole section ranges from 0.5 mm to 2 mm, a length of the valve port ranges from 0.5 mm to 2 mm, and a length of the second transition hole section ranges from 0.5 mm to 3 mm. In this way, the valve seat is machined simply and conveniently.

Further, the diameter of the first transition hole section ranges from 4.5 mm to 8 mm, and a diameter of the valve port ranges from 1.3 mm to 3.2 mm. With such an arrangement, when flowing from the first transition hole section to the valve port, the liquid fluid remains at the first transition hole section for a long time, so that much gas overflows from the liquid fluid, and the noise generated when the fluid flows is reduced.

Further, an end surface, close to the valve port, of the second connection port is provided with a connection groove, where the connection groove is annularly provided on an outer side of the second transition hole section. The connection groove is configured to be connected to the second connection pipe.

BRIEF DESCRIPTION OF THE DRAWINGS

The accompanying drawings of the description are used for providing further understanding of the disclosure as a constitute part of the disclosure. Illustrative examples of the disclosure and their descriptions serve to explain the disclosure, instead of limiting the disclosure improperly. In the accompanying drawings.

Figure 1:
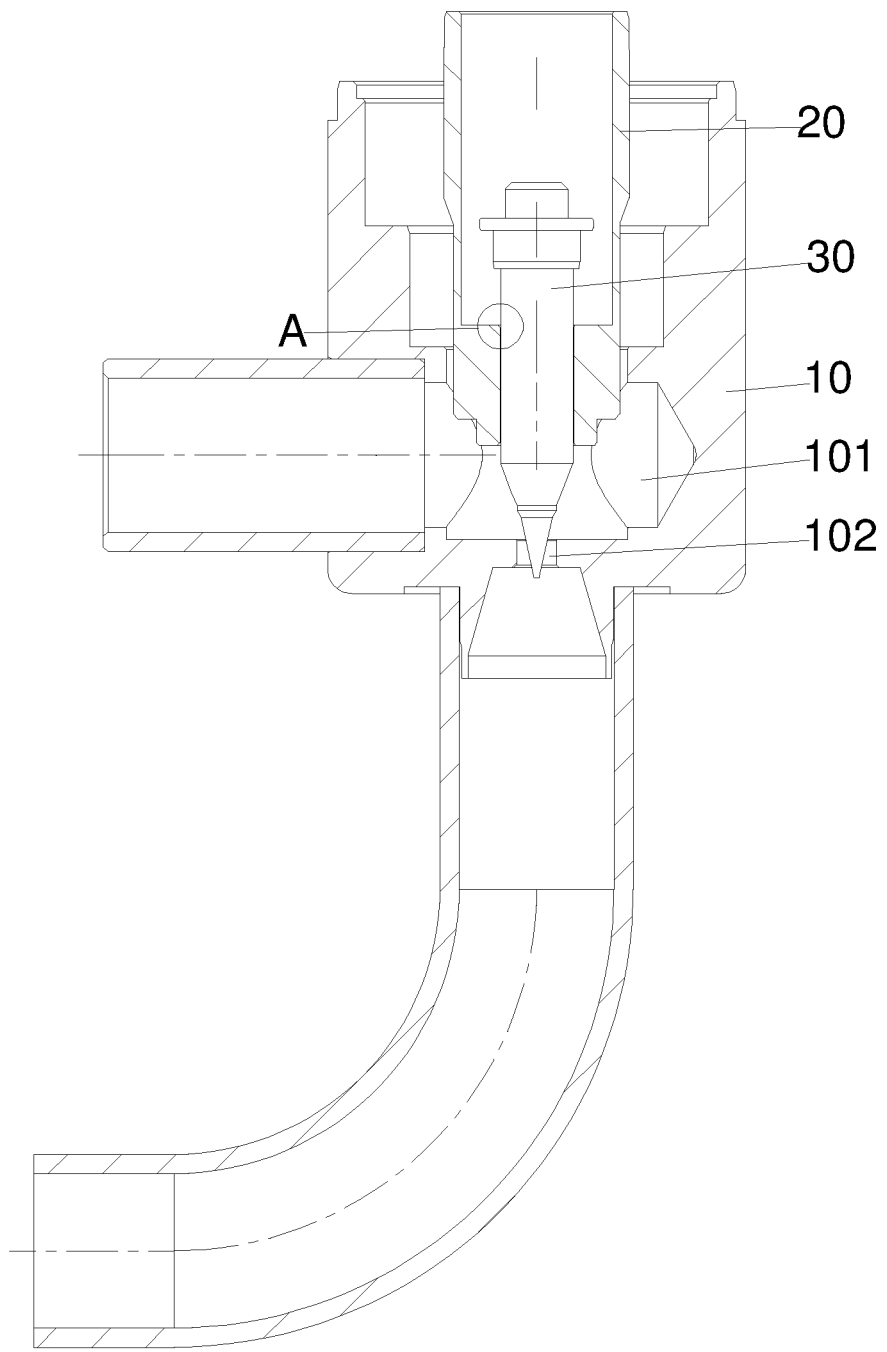
FIG. 1 shows a schematic structural diagram of assembling a valve seat, a guide sleeve, and a valve needle of an electronic expansion valve according to Example 1 of the disclosure.

The above accompanying drawings include the reference numerals as follows:

10. valve seat; 101. valve cavity; 102. valve port;
103. mounting hole; 104. first connection port; 105. second connection port;
106. first transition hole section; 107. second transition hole section; 108. third transition hole section; and 109. connection groove;
11. first connection pipe; 12. second connection pipe;
20. guide sleeve; 201. first guide hole; 202. second guide hole;
203. first end; 204. second end; 205. first hole section; and 206. second hole section;
21. body section; 22. thin-walled section; 23. fixing bulge;
30. valve needle; 31. cylindrical section; 32. conical section;
41. spring sleeve; 42. spring;
60. mounting cavity;
71. screw rod; 72. nut sleeve;
80. bearing; and
90. gasket.

DETAILED DESCRIPTION OF THE EMBODIMENTS

The technical solutions in examples of the disclosure are clearly and completely described below with reference to the accompanying drawings in the examples of the disclosure. Apparently, the examples described are merely some examples rather than all examples of the disclosure. The following description of at least one illustrative example is merely descriptive in nature and is definitely not intended to limit the disclosure and its application or use in any way. Based on the examples of the disclosure, all other examples derived by those of ordinary skill in the art without creative efforts are fall within the protection scope of the disclosure.

As shown in FIGS. 1-4, an example of the disclosure provides an electronic expansion valve. The electronic expansion valve includes a valve seat 10, a guide sleeve 20, and a valve needle 30. The valve seat 10 is provided with a valve cavity 101 and a valve port 102, where the valve port 102 is arranged at an end portion of the valve cavity 101; the guide sleeve 20 is fixedly arranged on the valve seat 10, the guide sleeve 20 and the valve port 102 are oppositely arranged, the guide sleeve 20 is provided with a first guide hole 201, and the first guide hole 201 is in communication with the valve cavity 101; and the valve needle 30 is movably arranged in the guide sleeve 20, an end of the valve needle 30 penetrates out of the first guide hole 201 to be arranged corresponding to the valve port 102, the valve needle 30 is in clearance fit with the first guide hole 201, the valve needle 30 is configured to control the valve port 102 to be opened or closed, and a swingable amplitude of the valve needle 30 in the first guide hole 201 ranges from 0.4° to 2.4°. That is, when the valve needle 30 swings to a position where a maximum distance between an end, close to the valve port 102, of the valve needle 30 and the valve port 102 is reached, the swingable amplitude of the valve needle 30 is twice an included angle between an axis of the valve needle 30 and an axis of the guide sleeve 20.

Figure 4:
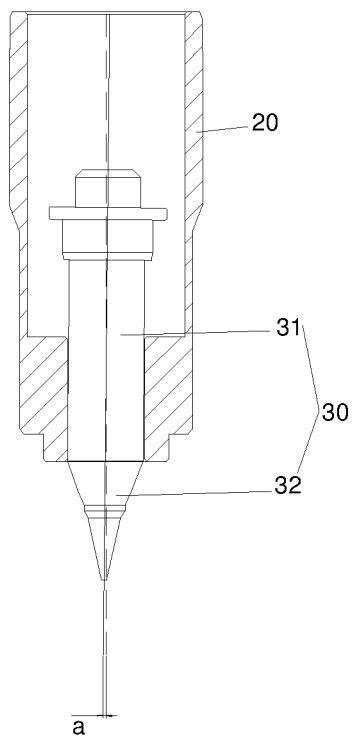
FIG. 4 shows a schematic structural diagram of cooperation between the guide sleeve and the valve needle in FIG. 1.

With the technical solution of the disclosure applied, when the electronic expansion valve works, a fluid applies a certain impact force to the valve needle 30. The valve needle 30 shakes under an action of the impact force from the fluid. In this case, the included angle exists between the axis of the valve needle 30 and the axis of the guide sleeve 20 and ranges from 0.2° to 1.2°. Specifically, as shown in FIG. 4, a denotes the included angle between the axis of the valve needle 30 and the axis of the guide sleeve 20 and may be 0.2°, 0.6°, or 1.2°. In the example, a equals 1°. If the included angle between the axis of the valve needle 30 and the axis of the guide sleeve 20 is greater than 1.2°, a swingable range of the valve needle 30 is too wide, so that the fluid is disturbed excessively owing to shaking of the valve needle 30, and a high fluid noise and a high shaking noise are generated finally. Moreover, the coaxiality between the valve needle 30 and the guide sleeve 20 is undesirable, which is not conducive to a cooperation between the valve needle 30 and the valve port 102. If the included angle between the axis of the valve needle 30 and the axis of the guide sleeve 20 is smaller than 0.2°, no gap between a side wall of the valve needle 30 and a hole wall of the first guide hole 201 can be ensured. In a repeated movement process of the valve needle 30, the side wall of the valve needle 30 may make contact with the hole wall of the first guide hole 201. In consequence, the valve needle 30 and the guide sleeve 20 are worn, and service lives of the valve needle 30 and the guide sleeve 20 are affected. Therefore, the swingable amplitude of the valve needle 30 is set to range from 0.4° to 2.4°. The shaking noise of the valve needle 30 and the fluid noise are reduced while the service lives of the valve needle 30 and the guide sleeve 20 are ensured.

In some embodiments, a gap between an outer side wall of the valve needle 30 and a hole wall of the first guide hole 201 ranges from 0.0075 mm to 0.05 mm. In an embodiment, the gap between the outer side wall of the valve needle and the first guide hole 201 may be set to range from 0.01 mm to 0.05 mm. Specifically, a1 denotes the gap between the outer side wall of the valve needle 30 and the hole wall of the first guide hole 201 and may specifically be 0.01 mm, 0.03 mm, or 0.05 mm. In the example, a1 equals 0.04 mm. If the gap between the outer side wall of the valve needle 30 and the hole wall of the first guide hole 201 is smaller than 0.01 mm, it is inconvenient to assemble the valve needle 30 to the guide sleeve 20, and when the valve needle 30 moves relative to the guide sleeve 20, a friction force between the valve needle and the guide sleeve is large. Therefore, the valve needle 30 encounters great motion resistance, and the valve needle and the guide sleeve wear against each other. In consequence, the smoothness of movement of the valve needle 30 and the service lives of the valve needle 30 and the guide sleeve 20 are affected. If the gap between the outer side wall of the valve needle 30 and the hole wall of the first guide hole 201 is greater than 0.05 mm, the swingable range of the valve needle 30 is too wide. Therefore, the coaxiality between the valve needle 30 and the valve port 102 is undesirable. The high fluid noise and the high shaking noise are generated finally in the working process of the electronic expansion valve, affecting the user experience. Therefore, the gap between the outer side wall of the valve needle 30 and the hole wall of the first guide hole 201 is set to range from 0.0075 mm to 0.05 mm. Therefore, the shaking noise of the valve needle 30 and the fluid noise are reduced while the service lives of the valve needle 30 and the guide sleeve 20 are ensured.

Figure 2:
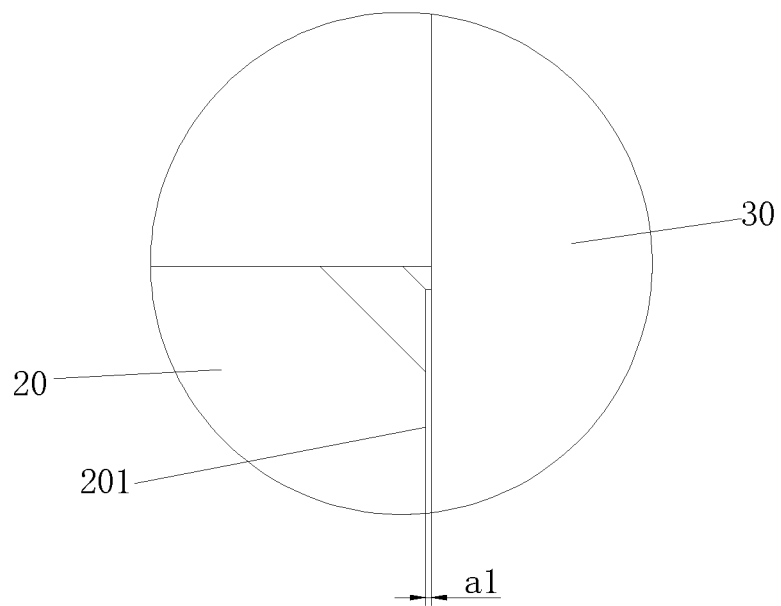
FIG. 2 shows a partial enlarged diagram of portion A in FIG. 1.

In some embodiments, a length of the first guide hole 201 is set to range from 1.5 mm to 7 mm. Specifically, as shown in FIG. 2, D denotes the length of the first guide hole 201 and may be 1.5 mm, 4 mm, or 7 mm. In the example, the length D of the first guide hole 201 is 6 mm. If the length of the first guide hole 201 is smaller than 1.5 mm, the guide effect of the guide sleeve 20 on the valve needle 30 is undesirable. Therefore, a shaking amplitude of the valve needle 30 is wide, and the high fluid noise and the high shaking noise are generated. If the length of the first guide hole 201 is greater than 7 mm, the guide sleeve 20 may occupy an excessive space in the valve cavity 101. Therefore, a turbulence phenomenon is caused, and the fluid noise is generated. Therefore, the length of the first guide hole 201 is set to range from 1.5 mm to 7 mm, so that the shaking noise and the fluid noise of the electronic expansion valve can be reduced.

As shown in FIGS. 1 and 4, the valve needle 30 includes a cylindrical section 31 and a conical section 32 that are sequentially arranged in an axial direction, where the conical section 32 is arranged close to the valve port 102; and the valve needle 30 is provided with a blocking position and a maximum opening position that are oppositely arranged, when the valve needle 30 moves to the maximum opening position, an entire conical section 32 is positioned on an outer side of the guide sleeve 20. With such an arrangement, when the valve needle 30 moves to the maximum opening, the guide effect of the guide sleeve 20 on the valve needle 30 can be ensured, a shaking amplitude of the valve needle 30 can be narrowed, and the fluid noise and the shaking noise can be reduced. Moreover, a distance between an end, away from the cylindrical section 31, of the conical section 32 and the valve port 102 can be ensured, and the valve needle 30 can control the valve port 102 to be opened or closed smoothly.

In some embodiments, when the valve needle 30 moves to the maximum opening position, a distance between an end surface, close to the conical section 32, of the cylindrical section 31 and an end surface of an end, close to the valve port 102, of the guide sleeve 20 is smaller than 1 mm. With such an arrangement, the valve needle 30 occupies a narrower space in the valve cavity 101, and the turbulence caused by the valve needle 30 in the working process of the electronic expansion valve is reduced, so as to further reduce the fluid noise while the guide effect of the guide sleeve 20 on the valve needle 30 is ensured. Therefore, with the above arrangement, the shaking noise of the valve needle 30 and the fluid noise are reduced.

In some embodiments, when the valve needle 30 moves to the maximum opening position, the end face, close to the conical section 32, of the cylindrical section 31 is flush with the end surface, close to the valve port 102, of the guide sleeve 20. With such an arrangement, the guide effect of the guide sleeve 20 on the valve needle 30 can be ensured, so as to reduce the shaking noise of the valve needle 30; the turbulence phenomenon caused by the valve needle 30 occupies an excessive space in the valve cavity 101 can be reduced, so as to reduce the fluid noise.

In some embodiments, chamfers are arranged on inner peripheral surfaces of two ends of the first guide hole 201. With the chamfers arranged, the smoothness in the movement process of the valve needle 30 can be improved while the valve needle 30 can be assembled to the guide sleeve 20 conveniently.

Figure 3:
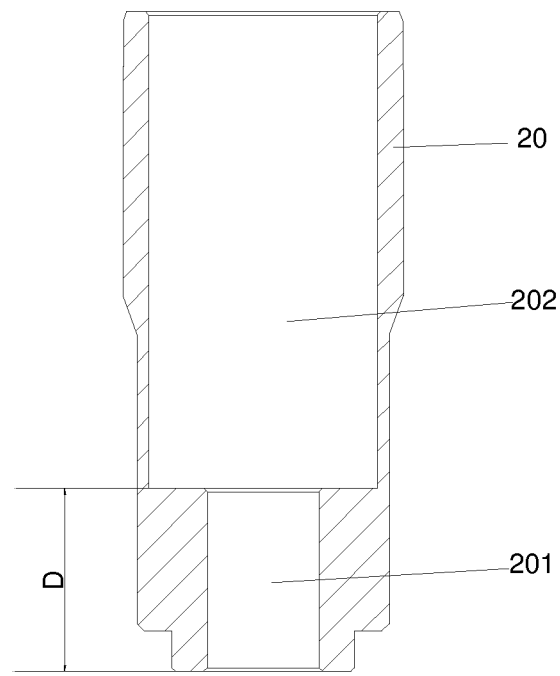
FIG. 3 shows a schematic structural diagram of the guide sleeve according to Example 1 of the disclosure.
Figure 5:
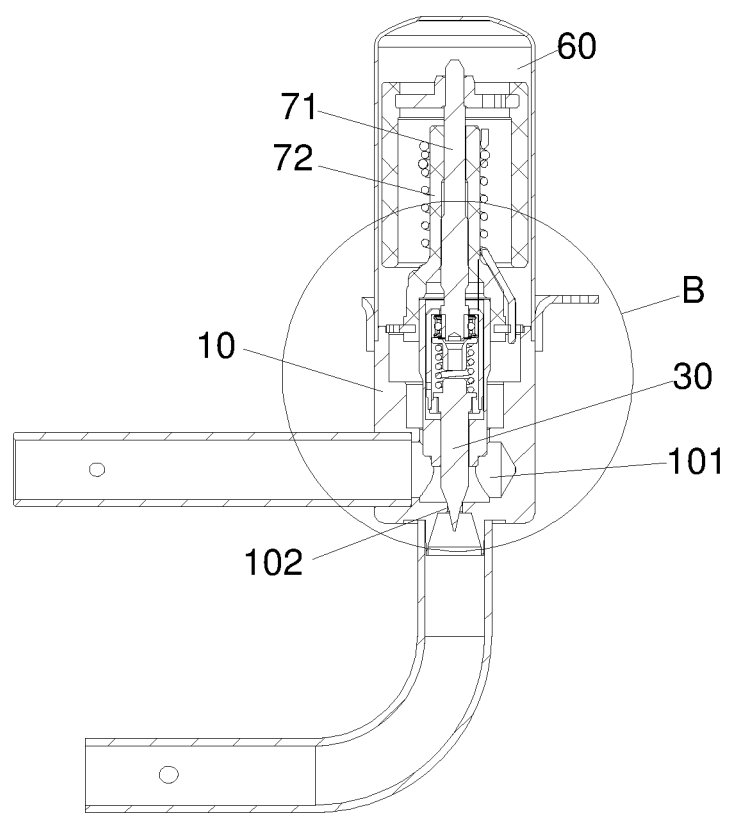
FIG. 5 shows a schematic structural diagram of the electronic expansion valve according to Example 1 of the disclosure.
Figure 6:
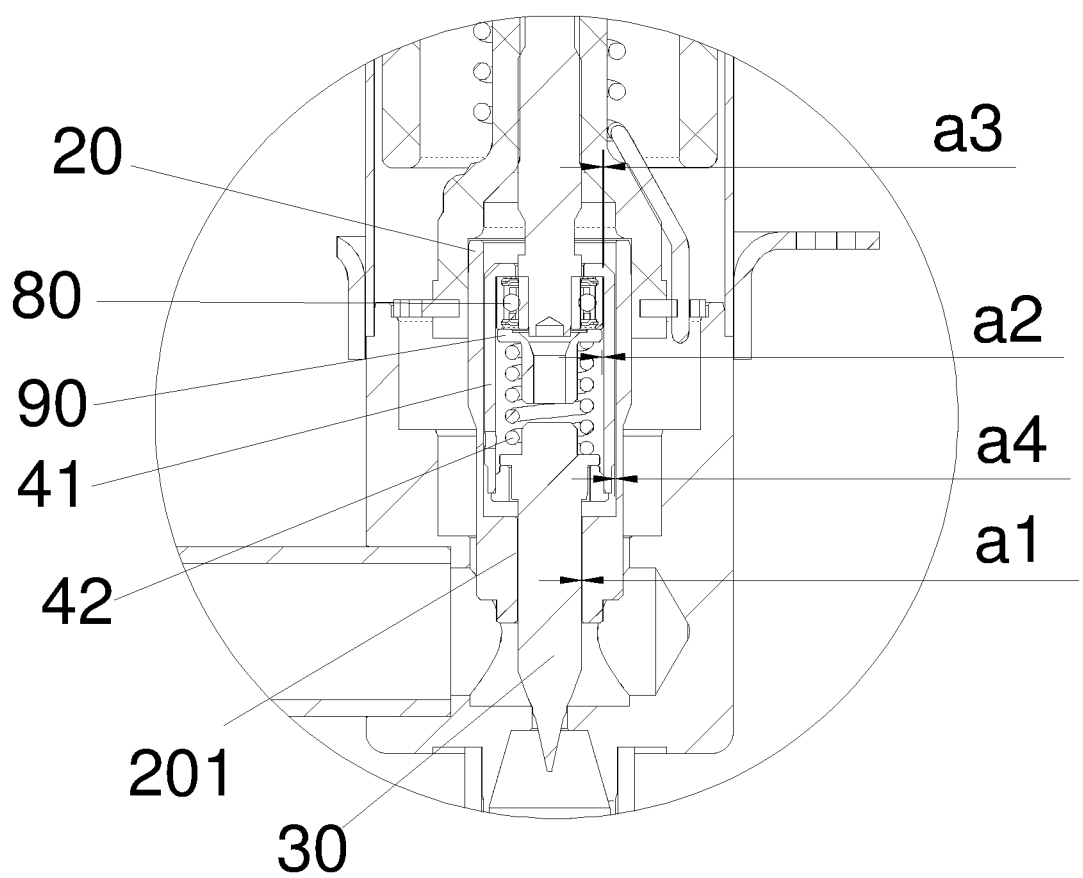
FIG. 6 shows a partial enlarged diagram of portion B in FIG. 5.

As shown in FIGS. 3, 5, and 6, the guide sleeve 20 is further provided with a second guide hole 202, wherein the second guide hole 202 is coaxially arranged with the first guide hole 201, the second guide hole 202 is positioned at an end, away from the valve cavity 101, of the first guide hole 201 and is in communication with the first guide hole 201, and an aperture of the second guide hole 202 is greater than an aperture of the first guide hole 201; and the electronic expansion valve further includes a spring sleeve 41 and a spring 42, where the spring sleeve 41 is movably arranged in the second guide hole 202, a second end, away from the valve port 102, of the valve needle 30 is positioned in the spring sleeve 41, the spring 42 is positioned in the spring sleeve 41, and a first end of the spring 42 abuts against the valve needle 30. In the movement process of the valve needle 30, the spring 42 buffers the movement of the valve needle 30 to ensure the stability in the movement process of the valve needle 30. In addition, when the fluid impacts the valve needle 30, the spring 42 buffers shaking of the valve needle 30 to narrow the shaking amplitude of the valve needle 30. Therefore, a mechanical noise generated when the valve needle 30 shakes is reduced. With the spring sleeve 41 arranged, stretch or retraction of the spring 42 can be guided, the stability in a stretch or retraction process of the spring 42 can be ensured, and a buffering effect of the spring 42 on the valve needle 30 can be ensured.

In some embodiments, the electronic expansion valve is further provided with a mounting cavity 60, where the mounting cavity 60 and the valve cavity 101 are in communication with each other and forms an accommodation cavity, and the mounting cavity 60 and the valve port 102 are oppositely arranged; and the electronic expansion valve further includes a screw rod 71 and a bearing 80. The screw rod 71 is movably arranged in the accommodation cavity, a first end of the screw rod 71 is positioned in the mounting cavity 60, and a second end of the screw rod 71 is positioned in the valve cavity 101; and the bearing 80 is arranged in the spring sleeve 41, the bearing 80 includes an inner ring and an outer ring, and an end portion of the screw rod 71 penetrates the spring sleeve 41 to be fixedly connected with the inner ring. In the example, a nut sleeve 72 is further arranged in the accommodation cavity, wherein the screw rod 71 is connected in the nut sleeve 72 through threads, and the screw rod 71 is close to or away from the valve port 102. With the above arrangement, each component is reasonably arranged and is structurally compact. The guide sleeve 20 guides the movement of the bearing 80, so as to ensure the stability in a movement process of the bearing 80, and the stability in a movement process of the screw rod 71 can be ensured accordingly. The screw rod 71 is fixedly connected with the inner ring of the bearing 80, so as to ensure the stability in a rotation process of the screw rod 71 and the motion linearity of the screw rod 71.

In some embodiments, the electronic expansion valve further includes a gasket 90, where the gasket 90 is arranged in the spring sleeve 41, the gasket 90 is positioned between the spring 42 and the bearing 80, a first end of the gasket 90 abuts against a second end, away from the valve needle 30, of the spring 42, and a second end of the gasket 90 abuts against the outer ring of the bearing 80. When rotating close to the valve port 102, the screw rod 71 moves to drive the bearing 80 to move, and the bearing 80 moves to drive the gasket 90 to move. In this case, the spring 42 is compressed, and the valve needle 30 moves close to the valve port 102. When rotating away from the valve port 102, the screw rod 71 moves to drive the bearing 80 to move. In this case, under the action of an elastic force of the spring 42, the gasket 90 abuts against the bearing 80 all the time until the screw rod 71 stops moving. By providing the gasket 90, the bearing 80 is prevented from making direct contact with the spring 42, and the bearing 80 and the spring 42 are prevented from interfering with each other in a rotation process of the bearing and a stretch or retraction process of the spring. In addition, the spring 42 is stressed uniformly, the stability and smoothness in the movement process of the valve needle 30 are ensured, and the mechanical noise and the fluid noise generated when the electronic expansion valve works are reduced.

With the technical solution of the disclosure applied, the resistance in the movement process of the valve needle 30 is reduced, so that the smoothness in the movement process of the valve needle 30 is ensured. In addition, the shaking amplitude of the valve needle 30 generated when the fluid impacts the valve needle 30 is reduced, so that the mechanical noise and the fluid noise generated when the valve needle 30 shakes are reduced, and the user experience is improved.

As shown in FIGS. 5 and 6, specifically, a1 denotes a gap between an outer side wall of the valve needle 30 and a hole wall of the first guide hole 201 and may be set to range from 0.0075 mm to 0.04 mm. The first guide hole 201 of the guide sleeve 20 guides the valve needle 30, so that the coaxiality between the valve needle 30 and the valve port 102 is desirable. If a1 is smaller than 0.0075 mm, the gap between the valve needle 30 and the first guide hole 201 is too small, and the friction between the valve needle and the guide sleeve is large when the valve needle 30 moves relative to the guide sleeve 20. In consequence, a motion resistance to the valve needle 30 is increased, and the valve needle may be stuck owing to a too small gap. If a1 is greater than 0.04 mm, the coaxiality between the valve needle 30 and the first guide hole 201 is undesirable, resulting in undesirable coaxiality between the valve needle 30 and the valve port 102. In consequence, the valve needle 30 is likely to shake seriously, and the mechanical or the fluid noise is high in a motion process. Therefore, a1 is set to range from 0.0075 mm to 0.04 mm. Accordingly, the motion resistance to the valve needle 30 is small, the valve needle 30 shakes slightly, and the mechanical or fluid noise of the electronic expansion valve is low. In some embodiments, a1 may be set to 0.0075 mm, 0.025 mm, or 0.04 mm.

With the technical solution of the disclosure applied, the gap a1 between an outer periphery of the valve needle 30 and an inner wall of the first guide hole 201 of the guide sleeve 20 ranges from 0.0075 mm to 0.04 mm. By setting a1 to range from 0.0075 mm to 0.04 mm, the coaxiality between the valve needle 30 and the valve port 102 can be ensured, the motion resistance to the valve needle 30 is small, the valve needle 30 shakes slightly, and the mechanical or fluid noise of the electronic expansion valve is low.

In some embodiments, a2 denotes a gap between the gasket 90 and the spring sleeve 41, and a1 is smaller than or equal to a2. If a1 is greater than a2, the coaxiality between the valve needle 30 and the second guide hole 202 is undesirable. In consequence, the coaxiality between the valve needle 30 and the valve port 102 is undesirable, and the valve needle 30 shakes and generates a high noise when moving. Therefore, a1 is smaller than or equal to a2, so that the coaxiality between the valve needle 30 and the valve port 102 is desirable, and the valve needle 30 shakes slightly and generates a low mechanical noise when moving.

In some embodiments, a3 denotes a gap between the bearing 80 and the spring sleeve 41, and a1 is smaller than or equal to a3. If a1 is greater than a3, the coaxiality between the valve needle 30 and the second guide hole 202 is undesirable. In consequence, the coaxiality between the valve needle 30 and the valve port 102 is undesirable, and the valve needle 30 shakes seriously and generates a high noise when moving. Therefore, a1 is smaller than or equal to a3, so that the coaxiality between the valve needle 30 and the valve port 102 is better, and the vibration of the valve needle 30 is relatively small and a mechanical noise is relatively small.

In some embodiments, a4 denotes a gap between the spring sleeve 41 and the guide sleeve 20, and a1 is smaller than or equal to a4. If a1 is greater than a4, the coaxiality between the valve needle 30 and the second guide hole 202 is poor. In consequence, the coaxiality between the valve needle 30 and the valve port 102 is poor, and the valve needle 30 shakes seriously and generates a high mechanical noise and a high fluid noise when moving. Therefore, a1 is smaller than or equal to a4, so that the coaxiality between the valve needle 30 and the valve port 102 is better, and the vibration of the valve needle 30 is relatively small and a mechanical noise is relatively small.

In some embodiments, the gap a2 between the gasket 90 and the spring sleeve 41 ranges from 0.04 mm to 0.15 mm. When a2 is smaller than 0.04 mm, a friction force between the gasket 90 and the spring sleeve 41 is large, resulting in a high mechanical noise and great motion resistance to the gasket 90. When a2 is greater than 0.15 mm, the coaxiality between the gasket 90 and the spring sleeve 41 is poor, resulting in the undesirable coaxiality between the gasket 90 and the valve port 102. In consequence, the coaxiality between the spring 42 and the valve port 102 and the coaxiality between the valve needle 30 and the valve port are undesirable, so that the valve needle 30 shakes seriously and generates a high mechanical noise and a high fluid noise when moving. Specifically, the gap a2 between the gasket 90 and the spring sleeve 41 may be 0.04 mm, 0.1 mm, or 0.15 mm.

In some embodiments, the gap a3 between the bearing 80 and the spring sleeve 41 ranges from 0.04 mm to 0.15 mm. When a3 is smaller than 0.04, a friction force between the bearing 80 and the spring sleeve 41 is large, resulting in great motion resistance to the bearing 80. In consequence, the valve needle 30 makes a slow response and generates a high noise. When a3 is greater than 0.15 mm, the coaxiality between the bearing 80 and the spring sleeve 41 is undesirable, resulting in the undesirable coaxiality between the screw rod 71 integrated with the bearing and the valve port 102. In consequence, the coaxiality between the gasket 90 and the valve port 102, the coaxiality between the spring 42 and the valve port, and the coaxiality between the valve needle 30 and the valve port are undesirable, so that the valve needle 30 shakes seriously and generates a high mechanical noise and a high fluid noise when moving. Specifically, the gap a3 between the bearing 80 and the spring sleeve 41 may be 0.04 mm, 0.1 mm, or 0.15 mm.

In some embodiments, the gap a4 between the spring sleeve 41 and the guide sleeve 20 ranges from 0.04 mm to 0.15 mm. When a4 is smaller than 0.04, a friction force between the guide sleeve 20 and the spring sleeve 41 is large, resulting in great motion resistance to the spring sleeve 41. In consequence, the valve needle 30 makes a slow response. When a4 is greater than 0.15 mm, the coaxiality between the guide sleeve 20 and the spring sleeve 41 is undesirable, therefore the coaxiality between the valve needle 30 and the valve port 102 is undesirable. In consequence, the valve needle 30 shakes seriously and generates a high mechanical noise and a high fluid noise when moving. Specifically, the gap a4 between the spring sleeve 41 and the guide sleeve 20 may be 0.04 mm, 0.1 mm, or 0.15 mm.

In the technical solution, the gap a1 between the outer periphery of the valve needle 30 and the inner wall of the second guide hole 202 of the guide sleeve 20 ranges from 0.0075 mm to 0.04 mm. Therefore, the coaxiality between the valve needle 30 and the valve port 102 can be ensured, the motion resistance to the valve needle 30 is small, the vibration of the valve needle 30 is small, and the mechanical or fluid noise of the electronic expansion valve is low. In addition, a2 denotes the gap between the gasket 90 and the spring sleeve 41, and a1 is smaller than or equal to a2; a3 denotes the gap between the bearing 80 and the spring sleeve 41, and a1 is smaller than or equal to a3; and a4 denotes the gap between the spring sleeve 41 and the guide sleeve 20, and a1 is smaller than or equal to a4. With such an arrangement, the coaxiality between the valve needle 30 and the valve port 102 is better, so that the shake of the valve needle 30 is small and a mechanical noise is small.

As shown in FIGS. 7-11, in Example 2 of the disclosure, the guide sleeve 20 includes a body section 21 and a thin-walled section 22 that are sequentially connected in an axial direction, where the body section 21 is provided with a first end 203 and a second end 204 that are oppositely arranged, the thin-walled section 22 is connected with the first end 203, and an end surface of the first end 203 and the thin-walled section 22 are positioned in the valve cavity 101; and an outer diameter of the thin-walled section 22 is smaller than an outer diameter of the first end 203, and an outer diameter of a first end, close to the body section 21, of the thin-walled section 22 is greater than an outer diameter of a second end, away from the body section 21, of the thin-walled section 22. The valve needle 30 is movably arranged in the guide sleeve 20, and the valve needle 30 partially penetrates the guide sleeve 20 to be positioned in the valve cavity 101. The valve needle 30 is configured to control the valve port 102 to be opened or closed, and the thin-walled section 22 guides the valve needle 30.

With the above technical solution, when flowing into the valve cavity 101, the fluid makes contact with the valve needle 30 and applies a certain impact force to the valve needle 30 and the guide sleeve 20. With the above arrangement, a height difference of a step structure formed between an end, close to the valve port 102, of the guide sleeve 20 and the valve needle 30 can be reduced. Accordingly, the turbulence phenomenon generated when the fluid impacts the step structure can be reduced, so as to reduce the fluid noise generated when the electronic expansion valve works. Further, by providing the thin-walled section 22, the guide effect of the guide sleeve 20 on the valve needle 30 can be enhanced, the shaking amplitude of the valve needle 30 can be further narrowed, so as to reduce the mechanical noise caused by shaking of the valve needle 30 when the electronic expansion valve works.

In some embodiments, a difference between the outer diameter of the thin-walled section 22 and an inner diameter of the thin-walled section 22 ranges from 0.15 mm to 1.5 mm. If the difference between the outer diameter of the thin-walled section 22 and the inner diameter of the thin-walled section 22 is smaller than 0.15 mm, a structural strength of the thin-walled section 22 is low. Moreover, the thin-walled section 22 is likely to be damaged under the action of a fluid impact for a long time, thus losing the guide effect on the valve needle 30. If the difference between the outer diameter of the thin-walled section 22 and the inner diameter of the thin-walled section 22 is greater than 1.5 mm, a height difference of the step structure formed by the thin-walled section 22 and the valve needle 30 is too large. Moreover, the thin-walled section 22 occupies an excessive space in the valve cavity 101, so that the fluid is disturbed, which increases the fluid noise generated when the electronic expansion valve works. Therefore, in the example, the difference between the outer diameter of the thin-walled section 22 and the inner diameter of the thin-walled section 22 is set to range from 0.15 mm to 1.5 mm. In this way, the mechanical noise and the fluid noise generated when the electronic expansion valve works can be reduced while the strength of the thin-walled section 22 can be ensured. Specifically, the difference between the outer diameter of the thin-walled section 22 and the inner diameter of the thin-walled section 22 may be set to 0.15 mm, 1 mm, or 1.5 mm.

In some embodiments, the thin-walled section 22 includes at least one of a tapered section and a linear section in a direction from the thin-walled section 22 to the body section 21. With such an arrangement, the guide sleeve 20 can be adapted to electronic expansion valves having different structures, and the adaptability of the guide sleeve 20 can be improved.

In some embodiments, the thin-walled section 22 may be configured as a single linear section. With such an arrangement, the guide sleeve 20 can be machined and formed conveniently. The thin-walled section 22 may also be configured as a single tapered section to minimize the influence on the fluid, or may also be configured as a combination of the linear section and the tapered section.

Figure 9:
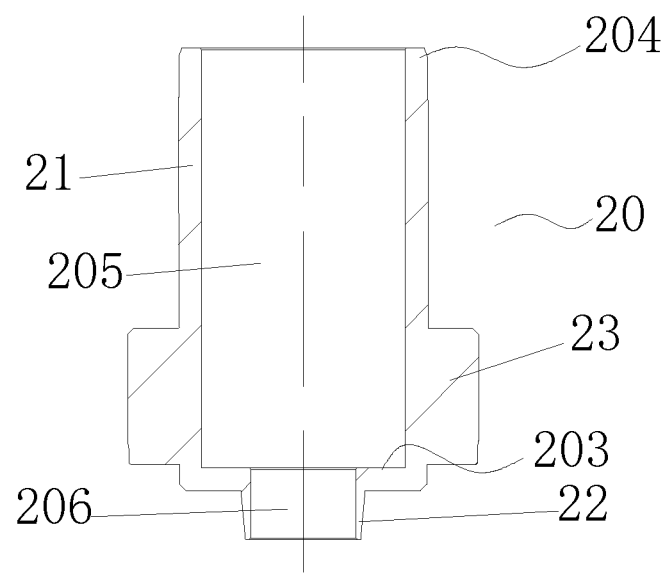
FIG. 9 shows a schematic structural diagram of a guide sleeve according to Example 2 of the disclosure.
Figure 10:
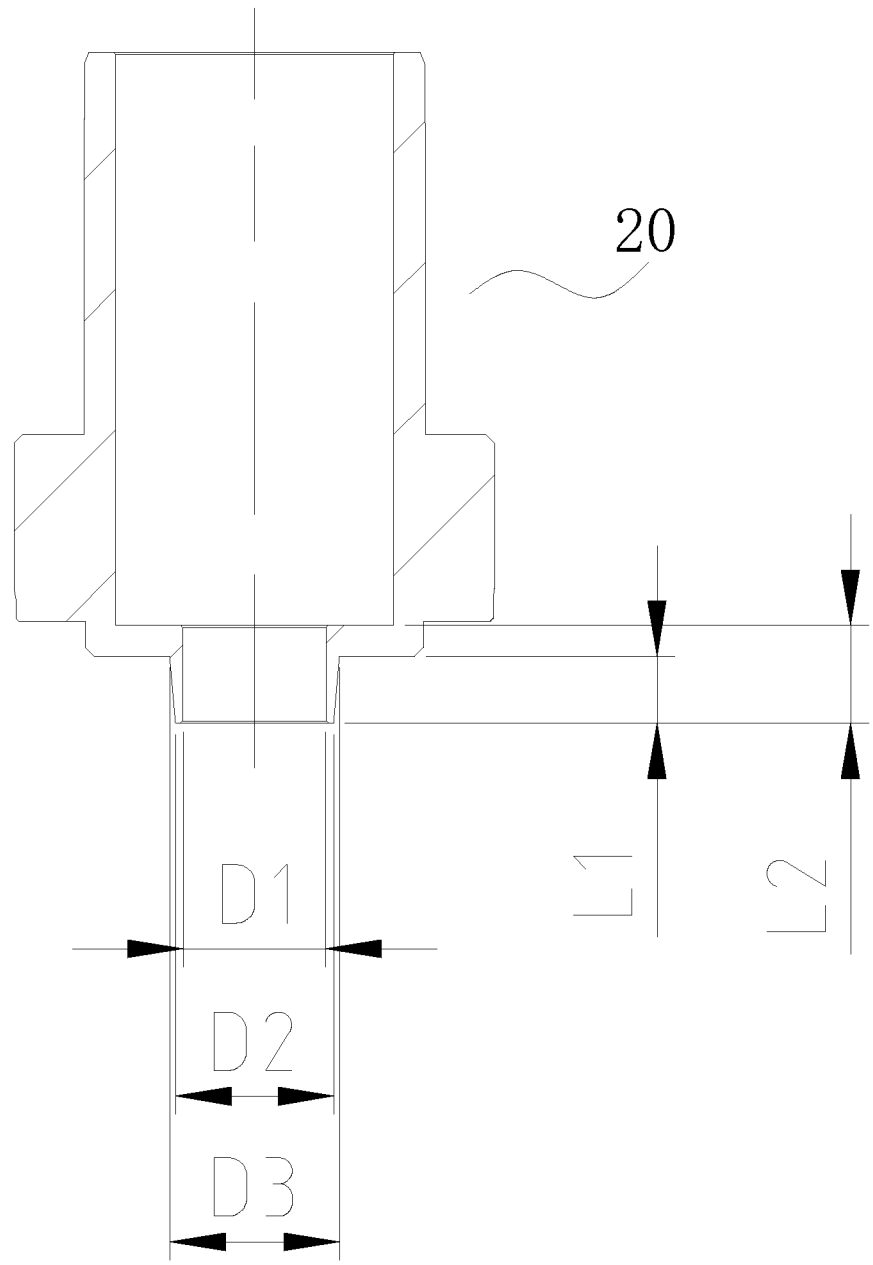
FIG. 10 shows a schematic dimensional diagram of the guide sleeve according to Example 2 of the disclosure.

As shown in FIGS. 9 and 10, the outer diameter of the thin-walled section 22 is gradually increased in the direction from the thin-walled section 22 to the body section 21. The thin-walled section 22 may be configured as a stepped section or a tapered section and a stepped section that are connected to each other. In the example, the thin-walled section 22 is a tapered section, D1 denotes the inner diameter of the thin-walled section 22, D2 denotes the outer diameter of a first end, away from the body section 21, of the thin-walled section 22, and D3 denotes the outer diameter of a second end, close to the body section 21, of the thin-walled section 22. A difference between D2 and D1 equals 0.15 mm, and a difference between D3 and D1 equals 1.5 mm. With such an arrangement, the fluid noise generated through the height difference of the step structure formed between the first end, away from the body section 21, of the thin-walled section 22 and the valve needle 30 can be reduced while the structural strength of the thin-walled section 22 can be ensured.

Figure 7:
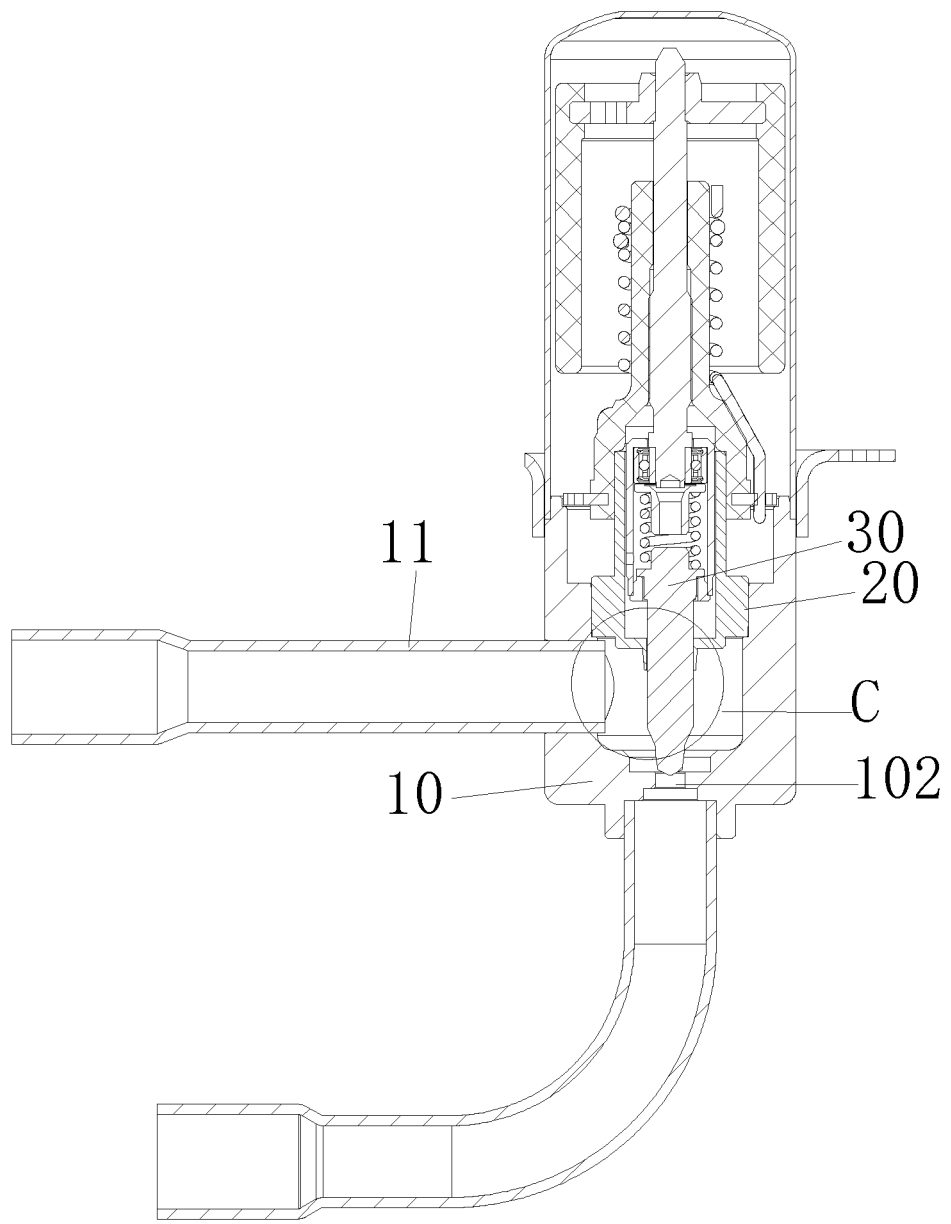
FIG. 7 shows a schematic structural diagram of an electronic expansion valve according to Example 2 of the disclosure.
Figure 8:
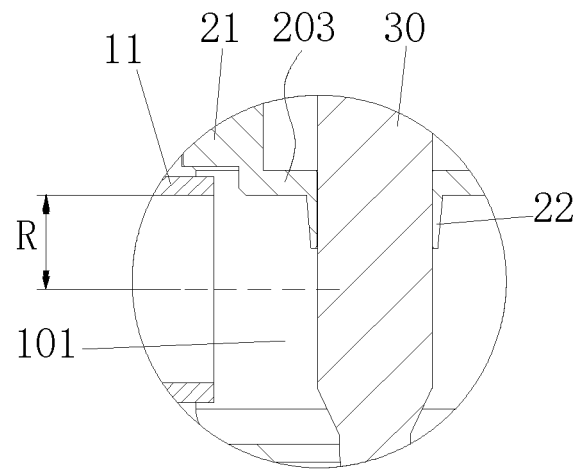
FIG. 8 shows a partial enlarged diagram of portion C in FIG. 7.

As shown in FIGS. 7 and 8, in some embodiments, the electronic expansion valve further includes a first connection pipe 11, where the first connection pipe 11 is arranged on the valve seat 10, the first connection pipe 11 is in communication with the valve cavity 101, and an axis of the first connection pipe 11 is perpendicular to an axis of the valve needle 30. R denotes a radius of the first connection pipe 11, and a distance between an end surface of the first end 203 and the axis of the first connection pipe 11 ranges from R−0.5 mm to R+0.5 mm. When the distance between the end surface of the first end 203 and the axis of the first connection pipe 11 is greater than R+0.5 mm, the distance between the first end, away from the body section 21, of the thin-walled section 22 and the valve port 102 is large, the shaking amplitude of the valve needle 30 may be wide, so that the mechanical noise may be generated when the electronic expansion valve works. When the distance between the end surface of the first end 203 and the axis of the first connection pipe 11 is smaller than R−0.5 mm, the thin-walled section 22 occupies an excessive space in the valve cavity 101. In consequence, the turbulence phenomenon may be caused, so that the fluid noise may be generated when the electronic expansion valve works. With the above arrangement, the fluid noise generated when the electronic expansion valve works can be reduced while the mechanical noise caused by shaking of the valve needle 30 when the electronic expansion valve works can be reduced.

In some embodiments, R denotes the distance between the end surface of the first end 203 and the axis of the first connection pipe 11. With such an arrangement, an entire thin-walled section 22 is positioned in the valve cavity 101 and suffered from the impact force from the fluid, so that the stability of the valve needle 30 is ensured. Moreover, when entering the valve cavity 101 through the first connection pipe 11, the fluid can be prevented from directly impacting the first end 203, so that the disturbance on the fluid and the fluid noise can be reduced.

Figure 11:
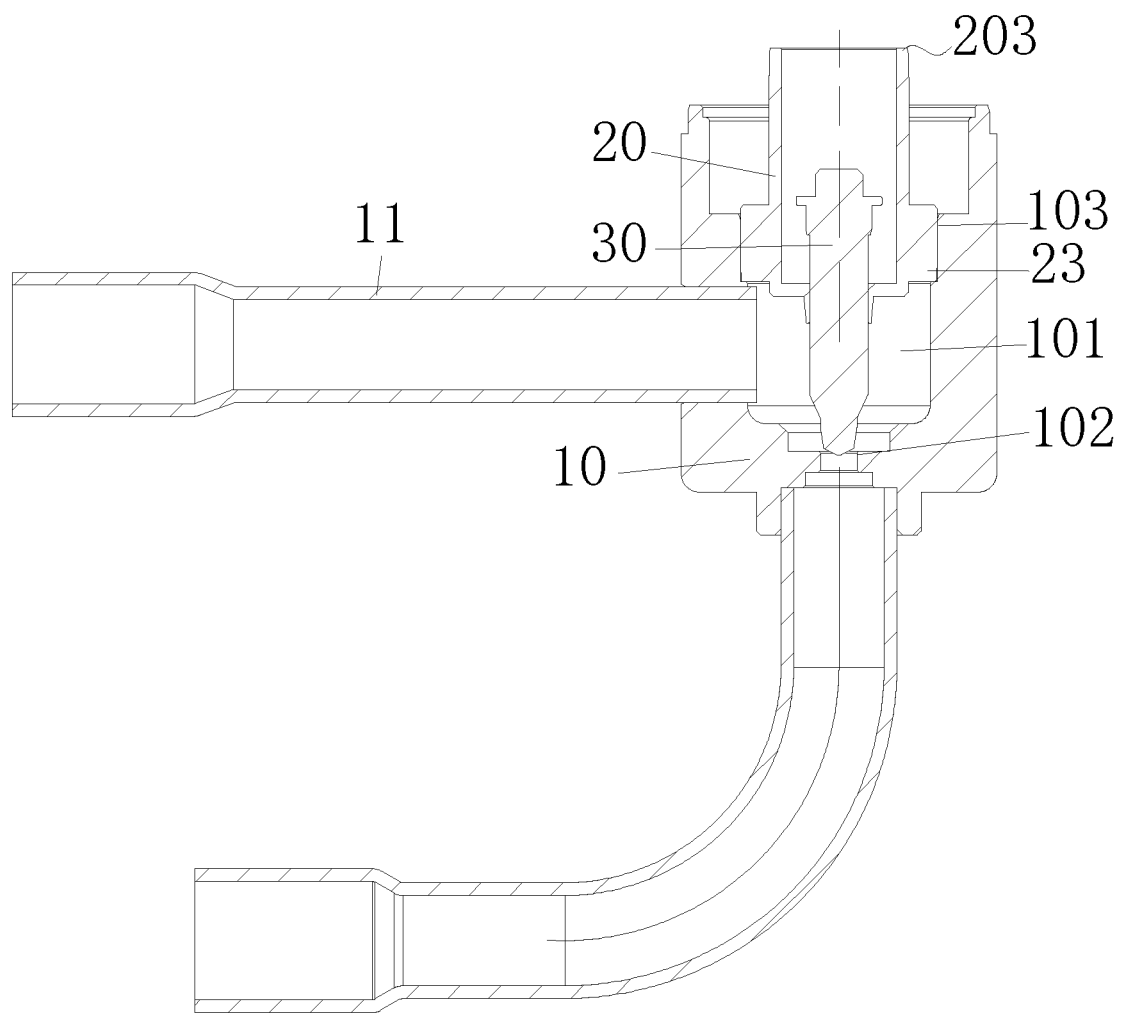
FIG. 11 shows a schematic structural diagram of cooperation between the guide sleeve and a valve seat according to Example 2 of the disclosure.

In some embodiments, as shown in FIGS. 9 and 11, the guide sleeve 20 is provided with a first hole section 205 and a second hole section 206 that are arranged in a stepped manner, where the first hole section 205 is positioned in the body section 21, the second hole section 206 penetrates the end surface of the first end 203 and the thin-walled section 22, and the second hole section 206 is configured to be in guide fit with the valve needle 30. Specifically, an aperture of the first hole section 205 is greater than that of the second hole section 206. With such an arrangement, the smoothness in a movement and mounting process of the valve needle 30 can be ensured and other components cooperating with the valve needle 30 can be mounted into the second hole section 206 conveniently.

In some embodiments, a length of the second hole section 206 ranges from 1.5 mm to 7 mm, and a length of the thin-walled section 22 is smaller than 6 mm. L1 denotes the length of the thin-walled section 22, and L2 denotes the length of the second hole section 206. The length of the second hole section 206 may equal 1.5 mm, 4 mm, or 7 mm. The length of the thin-walled section 22 may equal 1 mm, 3 mm or 6 mm. In the example, L1 equals 5 mm, and L2 equals 6 mm. With such an arrangement, not only a mating length of the guide sleeve 20 and the valve needle 30 can be ensured, but also the space of the valve chamber 101 occupied by the guide sleeve 20 can be reduced, and thus the mechanical noise caused by shaking of the valve needle and the fluid noise during working of the electronic expansion valve can be reduced on the whole. In some embodiments, chamfers are arranged on the guide sleeve 20, and the chamfers are positioned on inner peripheral surfaces of two ends of the second hole section 206 individually. With the chamfers arranged, assembling of the valve needle 30 can be guided, and mounting of the valve needle 30 can be facilitated.

As shown in FIGS. 9 and 11, in some embodiments, the guide sleeve 20 further includes a fixing bulge 23, where the fixing bulge 23 is annularly arranged on an outer side of the body section 21, the fixing bulge 23 is arranged close to the first end 203 of the body section 21, and the fixing bulge 23 is fixedly connected with the valve seat 10. Specifically, the valve seat 10 is provided with a mounting hole 103, where the mounting hole 103 is in communication with the valve cavity 101, and the mounting hole and the valve port 102 are oppositely arranged; and the fixing bulge 23 cooperates with the mounting hole 103, and the fixing bulges 23 is embedded in the mounting hole 103 to fixedly cooperate with the valve seat 10. Through the cooperation between the fixing bulge 23 and the mounting hole 103, a contact area between the guide sleeve 20 and the valve seat 10 can be ensured, so as to ensure the assembly stability between the guide sleeve 20 and the valve seat 10.

With the technical solution provided by the embodiments, the thin-walled section 22 is arranged, so that the height difference of the step structure formed between the guide sleeve 20 and the valve needle 30 can be reduced while the guide sleeve 20 can occupy a narrower space in the valve cavity 101. Accordingly, the turbulence phenomenon caused by the disturbance of the guide sleeve 20 on the fluid can be reduced, and the noise generated when the electronic expansion valve works can be reduced.

Figure 12:
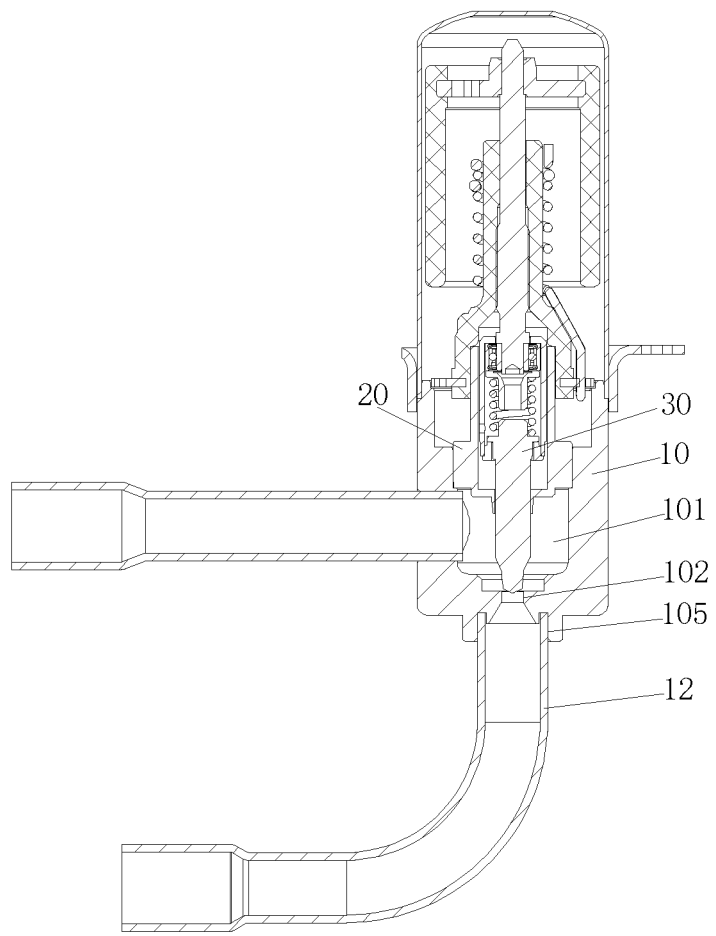
FIG. 12 shows a schematic structural diagram of an electronic expansion valve according to Example 3 of the disclosure.
Figure 13:
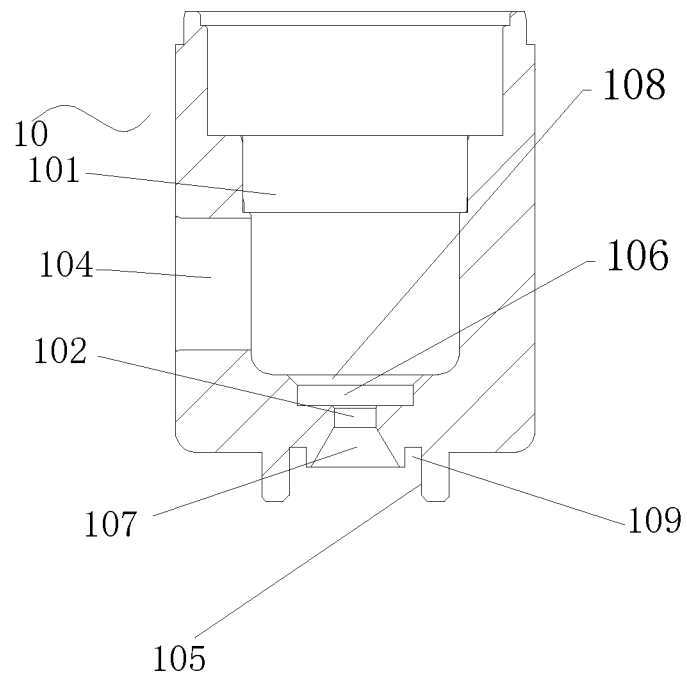
FIG. 13 shows a schematic structural diagram of a valve seat according to Example 3 of the disclosure.
Figure 14:
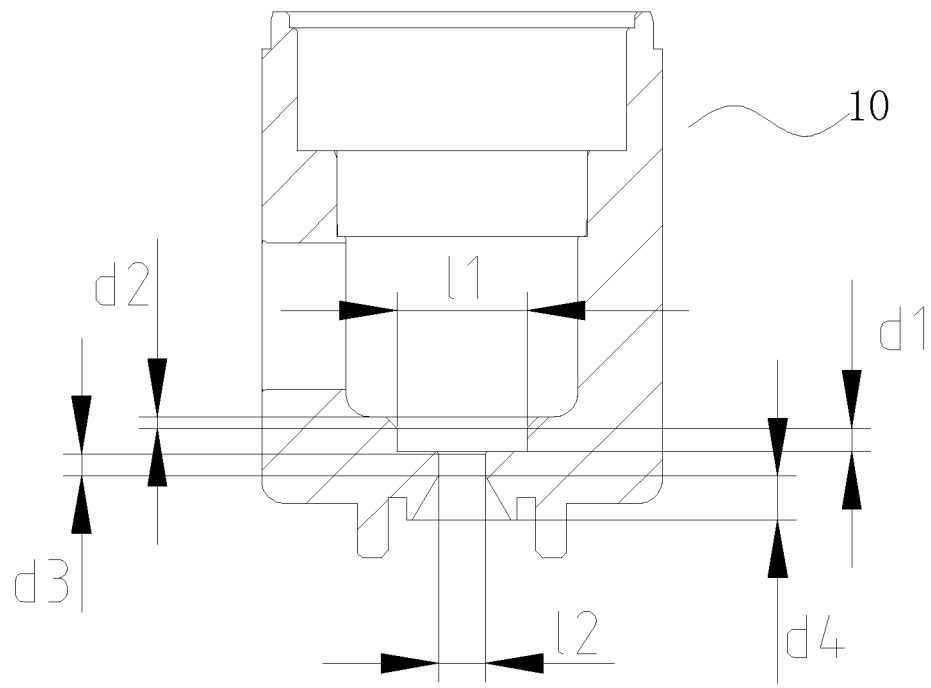
FIG. 14 shows a dimensional diagram of the valve seat according to Example 3 of the disclosure.

As shown in FIGS. 12-14, in an electronic expansion valve according to Example 3 of the disclosure, the valve seat 10 is provided with a first connection port 104 and a second connection port 105, where the first connection port 104 is in communication with the valve cavity 101, and the valve seat 10 is further provided with a first transition hole section 106 and a second transition hole section 107; the first transition hole section 106, the valve port 102, and the second transition hole section 107 are connected sequentially, the first transition hole section 106 is in communication with the valve cavity 101, and the second transition hole section 107 is in communication with the second connection port 105; and the second transition hole section 107 is provided with a third end and a fourth end that are oppositely arranged, where the third end is connected with the valve port 102, a diameter of the third end equals a diameter of the valve port 102, and a diameter of the second transition hole section 107 is gradually increased in a direction from the third end to the fourth end. The first connection port 104 and the second connection port 105 are connected to apparatuses in a use environment individually. The fluid flows from the first connection port 104 to the second connection port 105 or from the second connection port 105 to the first connection port 104.

With the technical solution of the embodiments, the third end of the second transition hole section 107 is connected with the valve port 102, the diameter of the third end equals the diameter of the valve port 102, and the diameter of the second transition hole section 107 is gradually increased from the third end to the fourth end. With such an arrangement, when the fluid flows from the first connection port 104 to the second connection port 105 or from the second connection port 105 to the first connection port 104, a diameter of a passage through which the fluid flows is changed gradually without being increased or decreased suddenly under the condition that the fluid flows through the valve port 102 and the second transition hole section 107. Therefore, the fluid can flow smoothly, which can reduce the possibility of generating a fluid vortex, so that the noise generated by the electronic expansion valve can be reduced.

In the embodiments, a diameter of a first end, close to the valve port 102, of the first transition hole section 106 is greater than a diameter of the valve port 102. With such an arrangement, when the fluid flows from the first connection port 104 to the second connection port 105, a liquid remains at the first transition hole section 106, and gas doped in the liquid fluid overflows into the valve cavity, so that the noise generated when the fluid flows through the valve port 102 can be reduced.

In some embodiments, the valve seat 10 is further provided with a third transition hole section 108, where the third transition hole section 108 is positioned at a second end, away from the valve port 102, of the first transition hole section 106; and a first end of the third transition hole section 108 is in communication with the first transition hole section 106, a second end of the third transition hole section 108 is in communication with the valve cavity 101, and a diameter of the third transition hole section 108 is gradually decreased in a direction towards the valve port 102. The diameter of the third transition hole section 108 is gradually decreased in the direction towards the valve port 102. Therefore, when the fluid flows from the first transition hole section 106 to the third transition hole section 108 or from the third transition hole section 108 to the first transition hole section 106, a diameter of a passage through which the fluid flows is changed gradually. Accordingly, no vortex is generated when the fluid flows, so that the noise generated when the fluid flows is low, and the noise of the electronic expansion valve is reduced.

In some embodiments, the first transition hole section 106 and the valve port 102 are cylindrical sections, and the second transition hole section 107 and the third transition hole section 108 are conical sections. The first transition hole section 106 and the valve port 102 are configured as the cylindrical sections, so that a machining process of the valve seat 10 is simple. The second transition hole section 107 and the third transition hole section 108 are configured as the conical sections, so that diameters of the second transition hole section 107 and the third transition hole section 108 are gradually and slowly changed. Accordingly, the noise generated when the fluid flows through the second transition hole section 107 and the third transition hole section 108 is further reduced.

In the example, the second transition hole section 107 is a tapered hole, and a taper angle of the second transition hole section 107 ranges from 30° to 65°. With such an arrangement, the diameter of the second transition hole section 107 is slowly changed, so that the noise generated when the fluid flows is further reduced.

In some embodiments, the sum of lengths of the first transition hole section 106 and the third transition hole section 108 ranges from 0.5 mm to 2 mm. If the sum of the lengths of the first transition hole section 106 and the third transition hole section 108 is smaller than 0.5 mm, the first transition hole section 106 and the third transition hole section 108 cannot retain many fluids, so that no much gas can overflow from the fluid. If the sum of the lengths of the first transition hole section 106 and the third transition hole section 108 is greater than 2 mm, an overall dimension of the valve seat 10 is large. Therefore, the sum of the lengths of the first transition hole section 106 and the third transition hole section 108 is set to range from 0.5 mm to 2 mm. Accordingly, the overall dimension of the valve seat 10 is small while the machining process of the valve seat 10 is simple. As shown in FIG. 14, d1 denotes the length of the first transition hole section 106, and d2 denotes the length of the third transition hole section 108. The sum of d1 and d2 may equal 0.5 mm, 1 mm, or 2 mm.

In some embodiments, the length of the valve port 102 is set to range from 0.5 mm to 2 mm. When the length of the valve port 102 is smaller than 0.5 mm, a contact area between the valve needle and the valve port 102 is small under the condition that the valve needle blocks the valve port 102, resulting in an undesirable sealing effect. When the length of the valve port 102 is greater than 2 mm, the overall dimension of the valve seat 10 is large. Therefore, the length of the valve port 102 is set to range from 0.5 mm to 2 mm. That is, the overall dimension of the valve seat 10 is small while the sealing performance of the electronic expansion valve is ensured. As shown in FIG. 14, d3 denotes the length of the valve port 102 and may be 0.5 mm, 1 mm, or 2 mm.

In some embodiments, the length of the second transition hole section 107 is set to range from 0.5 mm to 3 mm. If the length of the second transition hole section 107 is smaller than 0.5 mm, the diameter of an end, away from the valve port 102, of the second transition hole section 107 is small. The end, away from the valve port 102, of the second transition hole section 107 is connected with the second connection pipe 12 and has a diameter differing from that of the second connection pipe 12 greatly, resulting in a high noise when the fluid flows. If the length of the second transition hole section 107 is greater than 3 mm, the overall dimension of the valve seat 10 is large. Therefore, the length of the second transition hole section 107 is set to range from 0.5 mm to 3 mm, so that the overall dimension of the valve seat 10 is small while the fluid noise is reduced. As shown in FIG. 14, d4 denotes the length of the second transition hole section 107 and may be 0.5 mm, 1 mm, 2 mm, or 3 mm.

In some embodiments, the diameter of the first transition hole section 106 ranges from 4.5 mm to 8 mm. If the diameter of the first transition hole section 106 is smaller than 4.5 mm, the liquid fluid remains at the first transition hole section 106 for a short time, so that no much gas can overflow from the fluid. If the diameter of the first transition hole section 106 is greater than 8 mm, the structural dimension of the valve seat 10 is large, resulting in a large size of the electronic expansion valve. Therefore, the diameter of the first transition hole section 106 is set to range from 4.5 mm to 8 mm. That is, the structural size of the valve seat 10 can be small while much gas can overflow from the fluid. In some embodiments, the diameter of the valve port 102 ranges from 1.3 mm to 3.2 mm. If the diameter of the valve port 102 is smaller than 1.3 mm, the fluid has a slow flowing speed. If the diameter of the valve port 102 is greater than 3.2 mm, the diameter of the valve port 102 is slightly different from the diameter of the first transition hole section 106, and the fluid remains at the first transition hole section 106 for a short time, so that no much gas can overflow from the fluid. Therefore, the diameter of the valve port 102 is set to range from 1.3 mm to 3.2 mm.

That is, much gas can overflow from the fluid while the flowing speed of the fluid can be ensured. As shown in FIG. 14, l1 denotes the diameter of the first transition hole section 106. l1 may equal 4.5 mm, 6 mm, or 8 mm. Also, l2 denotes the diameter of the valve port 102 and may equal 1.3 mm, 2 mm, or 3.2 mm.

In some embodiments, an end surface, close to the valve port 102, of the second connection port 105 is provided with a connection groove 109, where the connection groove 109 is annularly arranged on an outer side of the second transition hole section 107. The second connection pipe 12 is connected through the connection groove 109. In this way, the second connection pipe 12 can be connected with the valve seat 10 conveniently, and a connection space is provided for the connection between the second connection pipe and the valve seat. Therefore, the connection stability between the second connection pipe and the valve seat is ensured.

The electronic expansion valve employing the valve seat 10 described according to the above technical solution has a low noise and a simple machining process.

In the technical solution, the third end of the second transition hole section 107 is connected to the valve port 102, the diameter of the third end equals the diameter of the valve port 102, and the diameter of the second transition hole section 107 is gradually increased in the direction from the third end to the fourth end. With such an arrangement, when the fluid flows from the first connection port 104 to the second connection port 105 or from the second connection port 105 to the first connection port 104, the diameter of the passage through which the fluid flows is changed gradually without being increased or decreased suddenly under the condition that the fluid flows through the valve port 102 and the second transition hole section 107. Therefore, the fluid can flow smoothly, which can reduce the possibility of generating the fluid vortex, so that the noise generated by the electronic expansion valve can be reduced. The diameter of the first end, close to the valve port 102, of the first transition hole section 106 is greater than a diameter of the valve port 102. Accordingly, when the fluid flows from the first connection port 104 to the second connection port 105, the liquid remains at the first transition hole section 106, and the gas doped in the liquid fluid overflows into the valve cavity, so that the noise generated when the fluid flows through the valve port 102 can be reduced while more liquid fluid can flow through the valve port. The valve seat 10 is further provided with the third transition hole section 108, where the third transition hole section 108 is positioned at the second end, away from the valve port 102, of the first transition hole section 106, and the diameter of the third transition hole section 108 is gradually decreased in the direction towards the valve port 102. In this way, when the fluid flows from the first transition hole section 106 to the third transition hole section 108 or from the third transition hole section 108 to the first transition hole section 106, the diameter of the passage through which the fluid flows is changed gradually. Accordingly, no vortex is generated when the fluid flows, so that the noise generated when the fluid flows is low, and the noise of the electronic expansion valve is reduced.

It should be noted that the terms used herein are merely used to describe the particular embodiments, and are not intended to limit the illustrative embodiments according to the disclosure. As used herein, the singular form is also intended to include the plural form unless clearly indicated otherwise in the context. In addition, it should also be understood that the terms "encompass" and/or "comprise" and "include", when used in the description, specify the presence of features, steps, operations, devices, assemblies, and/or their combinations.

The relative arrangement of components and steps, numerical expressions, and numerical values set forth in these examples do not limit the scope of the disclosure unless specifically stated otherwise. Moreover, it should be understood that the dimensions of all portions shown in the accompanying drawings are not drawn to actual scale for ease of description. Techniques, methods, and apparatuses known to those of ordinary skill in the art may not be discussed in detail, but where appropriate, should be deemed as part of the granted description. In all instances shown and discussed herein, any particular value should be interpreted as merely being illustrative instead of being restrictive. Therefore, other instances in the illustrative examples can have different values. It should be noted that similar numerals and letters denote similar items in the following accompanying drawings. Thus, once a certain item is defined in one accompanying drawing, it is not required to be discussed further in subsequent accompanying drawings.

In the description of the disclosure, it should be understood that the orientation or position relations indicated by the orientation words such as "front, back, up, down, left, and right", "transverse, vertical, perpendicular, and horizontal", and "top and bottom" are generally based on the orientation or position relations shown in the accompanying drawings, are merely for facilitating the description of the disclosure and simplifying the description, rather than indicating or implying that the device or element referred to must have a particular orientation or be constructed and operated in a particular orientation unless stated reversely otherwise, and therefore cannot be interpreted as limiting the scope of protection of the disclosure. The orientation words "inner and outer" mean the interior and exterior relative to the outline of each component itself.

For ease of description, the spatially-relative terms such as "on", "above", "on the upper surface", and "on the upper portion" can be used herein to describe the spatial position relation between one device or feature and another device or feature as shown in the figures. It should be understood that the spatially-relative terms are intended to encompass different orientations in use or operation except for the orientation of the device described in the figures. For example, if the device in the accompanying drawings is inverted, a device described as "above another device or configuration" or "on another device or configuration" will then be located as "below another device or configuration" or "underneath another device or configuration". Therefore, the illustrative term "above" can indicate two orientations "above" and "below". The device can also be located in other different ways (being rotated by 90 degrees or in another orientation), and the spatially-relative descriptions used herein are interpreted correspondingly.

In addition, it should be noted that the use of the terms such as "first" and "second" to define components is merely for facilitating distinguishment between corresponding parts. Unless stated otherwise, the above terms have no special meanings, and therefore cannot be interpreted as limiting the scope of protection of the disclosure.

What are described above are merely the preferred examples of the disclosure, but are not intended to limit the disclosure. Those skilled in the art can make various changes and variations to the disclosure. Any modifications, equivalent replacements, improvements, etc. made within the spirit and principles of the disclosure should fall within the scope of protection of the disclosure.

What is claimed is:

1. An electronic expansion valve, comprising:
    a valve seat provided with a valve cavity and a valve port, wherein the valve port is provided at an end portion of the valve cavity;
    a guide sleeve fixedly arranged on the valve seat, wherein the guide sleeve and the valve port are oppositely arranged, the guide sleeve is provided with a first guide hole, and the first guide hole is in communication with the valve cavity; and
    a valve needle movably arranged in the guide sleeve, wherein a first end of the valve needle penetrates out of the first guide hole to be arranged corresponding to the valve port, the valve needle is in clearance fit with the first guide hole, the valve needle is configured to control the valve port to be opened or closed, and a swingable amplitude of the valve needle in the first guide hole ranges from 0.4° to 2.4°;
    wherein the guide sleeve is further provided with a second guide hole, the second guide hole is coaxially arranged with the first guide hole, the second guide hole is positioned at an end, away from the valve cavity, of the first guide hole and is in communication with the first guide hole, and an aperture of the second guide hole is greater than an aperture of the first guide hole; and the electronic expansion valve further comprises a spring sleeve and a spring, wherein the spring sleeve is movably arranged in the second guide hole, a second end, away from the valve port, of the valve needle is positioned in the spring sleeve, the spring is positioned in the spring sleeve, and a first end of the spring abuts against the valve needle.

2. The electronic expansion valve according to claim 1, wherein a gap between an outer side wall of the valve needle and an inner wall of the first guide hole ranges from 0.0075 mm to 0.05 mm; or a length of the first guide hole ranges from 1.5 mm to 7 mm.

3. The electronic expansion valve according to claim 1, wherein the valve needle comprises a cylindrical section and a conical section that are sequentially arranged in an axial direction, and the conical section is arranged close to the valve port; and the valve needle is provided with a blocking position and a maximum opening position that are oppositely arranged, and when the valve needle moves to the maximum opening position, the conical section is positioned on an outer side of the guide sleeve entirely.

4. The electronic expansion valve according to claim 3, wherein when the valve needle moves to the maximum opening position, a distance between an end surface, close to the conical section, of the cylindrical section and an end surface of an end, close to the valve port, of the guide sleeve is smaller than 1 mm.

5. The electronic expansion valve according to claim 4, wherein when the valve needle moves to the maximum opening position, the end face, close to the conical section, of the cylindrical section is flush with the end surface, close to the valve port, of the guide sleeve.

6. The electronic expansion valve according to claim 1, wherein chamfers are arranged on inner peripheral surfaces of two ends of the first guide hole.

7. The electronic expansion valve according to claim 1, wherein the electronic expansion valve is further provided with a mounting cavity, the mounting cavity and the valve cavity are in communication with each other and forms an accommodation cavity, and the mounting cavity and the valve port are oppositely arranged; and the electronic expansion valve further comprises:
    a screw rod movably arranged in the accommodation cavity, wherein a first end of the screw rod is positioned in the mounting cavity, and a second end of the screw rod is positioned in the valve cavity; and
    a bearing arranged in the spring sleeve, wherein the bearing comprises an inner ring and an outer ring, and an end portion of the screw rod penetrates the spring sleeve to be fixedly connected with the inner ring;
    a gap between an outer side wall of the valve needle and a hole wall of the first guide hole is a1, a gap between the bearing and the spring sleeve is a3, and a1 is smaller than or equal to a3.

8. The electronic expansion valve according to claim 7, wherein the electronic expansion valve further comprises a spring sleeve, a gap between the spring sleeve and the guide sleeve is a4, and a1 is smaller than or equal to a4.

9. The electronic expansion valve according to claim 7, further comprising a gasket, wherein the gasket is arranged in the spring sleeve, the gasket is positioned between the spring and the bearing, a first end of the gasket abuts against a second end, away from the valve needle, of the spring, and a second end of the gasket abuts against the outer ring of the bearing;
    wherein a2 denotes a gap between the gasket and the spring sleeve, and a1 is smaller than or equal to a2.

10. The electronic expansion valve according to claim 7, wherein the gap a3 between the bearing and the spring sleeve ranges from 0.04 mm to 0.15 mm.

11. The electronic expansion valve according to claim 8, wherein the gap a4 between the spring sleeve and the guide sleeve ranges from 0.04 mm to 0.15 mm.

12. An electronic expansion valve, comprising:
a valve seat provided with a valve cavity and a valve port, wherein the valve port is provided at an end portion of the valve cavity;
a guide sleeve fixedly arranged on the valve seat, wherein the guide sleeve and the valve port are oppositely arranged, the guide sleeve is provided with a first guide hole, and the first guide hole is in communication with the valve cavity; and
a valve needle movably arranged in the guide sleeve, wherein a first end of the valve needle penetrates out of the first guide hole to be arranged corresponding to the valve port, the valve needle is in clearance fit with the first guide hole, the valve needle is configured to control the valve port to be opened or closed, and a swingable amplitude of the valve needle in the first guide hole ranges from 0.4° to 2.4°;
wherein the guide sleeve comprises a body section and a thin-walled section that are sequentially connected in an axial direction, the body section is provided with a first end and a second end that are oppositely arranged, the thin-walled section is connected with the first end of the body section, and an end surface of the first end and the thin-walled section are positioned in the valve cavity; an outer diameter of the thin-walled section is smaller than an outer diameter of the first end of the body section, and an outer diameter of a first end, close to the body section, of the thin-walled section is greater than an outer diameter of a second end, away from the body section, of the thin-walled section; and the valve needle partially penetrates the guide sleeve to be positioned in the valve cavity, and the thin-walled section is capable of guiding the valve needle.

13. The electronic expansion valve according to claim 12, wherein a difference between the outer diameter of the thin-walled section and an inner diameter of the thin-walled section ranges from 0.15 mm to 1.5 mm.

14. The electronic expansion valve according to claim 13, wherein the thin-walled section comprises at least one of a tapered section and a linear section in a direction from the thin-walled section to the body section.

15. The electronic expansion valve according to claim 12, wherein the outer diameter of the thin-walled section is gradually increased in a direction from the thin-walled section to the body section.

16. The electronic expansion valve according to claim 12, further comprising:
a first connection pipe arranged on the valve seat, wherein the first connection pipe is in communication with the valve cavity, and an axis of the first connection pipe is perpendicular to an axis of the valve needle; and
R denotes a radius of the first connection pipe, and a distance between the end surface of the first end of the body section and the axis of the first connection pipe ranges from R−0.5 mm to R+0.5 mm.

17. The electronic expansion valve according to claim 16, wherein R denotes the distance between the end surface of the first end of the body section and the axis of the first connection pipe.

18. The electronic expansion valve according to claim 12, wherein the guide sleeve is provided with a first hole section and a second hole section that are arranged in a stepped manner, the first hole section is positioned in the body section, the second hole section penetrates the end surface of the first end of the body section and the thin-walled section, and the second hole section is configured to be in guide fit with the valve needle.

19. The electronic expansion valve according to claim 18, wherein a length of the second hole section ranges from 1.5 mm to 7 mm, and a length of the thin-walled section is smaller than 6 mm.

20. The electronic expansion valve according to claim 18, wherein chamfers are arranged on the guide sleeve, and the chamfers are positioned on inner peripheral surfaces of two ends of the second hole section individually.

21. An electronic expansion valve, comprising:
a valve seat provided with a valve cavity and a valve port, wherein the valve port is provided at an end portion of the valve cavity;
a guide sleeve fixedly arranged on the valve seat, wherein the guide sleeve and the valve port are oppositely arranged, the guide sleeve is provided with a first guide hole, and the first guide hole is in communication with the valve cavity; and
a valve needle movably arranged in the guide sleeve, wherein a first end of the valve needle penetrates out of the first guide hole to be arranged corresponding to the valve port, the valve needle is in clearance fit with the first guide hole, the valve needle is configured to control the valve port to be opened or closed, and a swingable amplitude of the valve needle in the first guide hole ranges from 0.4° to 2.4°;
wherein the valve seat is provided with a first connection port and a second connection port, and the first connection port is in communication with the valve cavity; the valve seat is further provided with a first transition hole section and a second transition hole section, wherein the first transition hole section, the valve port, and the second transition hole section are connected sequentially, the first transition hole section is in communication with the valve cavity, and the second transition hole section is in communication with the second connection port; and the second transition hole section is provided with a third end and a fourth end that are oppositely arranged, wherein the third end is connected with the valve port, a diameter of the third end is equal to a diameter of the valve port, and a diameter of the second transition hole section is gradually increased in a direction from the third end to the fourth end.

22. The electronic expansion valve according to claim 21, wherein a diameter of a first end, close to the valve port, of the first transition hole section is greater than the diameter of the valve port.

23. The electronic expansion valve according to claim 22, wherein the valve seat is further provided with a third transition hole section, and the third transition hole section is positioned at a second end, away from the valve port, of the first transition hole section;
and a first end of the third transition hole section is in communication with the first transition hole section, a second end of the third transition hole section is in communication with the valve cavity, and a diameter of the third transition hole section is gradually decreased in a direction towards the valve port.

24. The electronic expansion valve according to claim 23, wherein the first transition hole section and the valve port are cylindrical sections, and the second transition hole section and the third transition hole section are conical sections.

25. The electronic expansion valve according to claim 21, wherein the second transition hole section is a tapered hole, and a taper angle of the second transition hole section ranges from 30° to 65°.

26. The electronic expansion valve according to claim 21, wherein a sum of a length of the first transition hole section and a length of the third transition hole section ranges from 0.5 mm to 2 mm, a length of the valve port ranges from 0.5 mm to 2 mm, and a length of the second transition hole section ranges from 0.5 mm to 3 mm.

27. The electronic expansion valve according to claim 21, wherein a diameter of the first transition hole section ranges from 4.5 mm to 8 mm, and a diameter of the valve port ranges from 1.3 mm to 3.2 mm.

28. The electronic expansion valve according to claim 21, wherein an end surface, close to the valve port, of the second connection port is provided with a connection groove, and the connection groove is annularly provided on an outer side of the second transition hole section.

\* \* \* \* \*